United States Patent [19]
Honkasalo et al.

[11] Patent Number: 6,101,176
[45] Date of Patent: Aug. 8, 2000

[54] METHOD AND APPARATUS FOR OPERATING AN INDOOR CDMA TELECOMMUNICATIONS SYSTEM

[75] Inventors: Harri Honkasalo; Zhi-Chun Honkasalo, both of Bedford; Oguz Sunay, Irving; Lin Ma, Euless, all of Tex.; Ari Hottinen, Vantaa, Finland

[73] Assignee: Nokia Mobile Phones, Espoo, Finland

[21] Appl. No.: 08/815,727

[22] Filed: Mar. 12, 1997

Related U.S. Application Data

[63] Continuation-in-part of application No. 08/685,578, Jul. 24, 1996, Pat. No. 5,864,549.

[51] Int. Cl.[7] .................................................. H04L 13/10
[52] U.S. Cl. ............................ 370/335; 375/346; 455/501
[58] Field of Search ..................................... 370/335, 336, 370/337, 342, 345, 347, 350, 203, 206, 280, 331, 332; 375/200, 206, 346; 455/501, 502

[56] References Cited

U.S. PATENT DOCUMENTS

| | | | |
|---|---|---|---|
| 4,893,327 | 1/1990 | Stern et al. ............................... | 379/59 |
| 5,280,472 | 1/1994 | Gilhousen et al. ........................ | 370/18 |
| 5,513,176 | 4/1996 | Dean et al. ................................ | 370/18 |
| 5,533,011 | 7/1996 | Dean et al. ................................ | 370/18 |
| 5,557,639 | 9/1996 | Heikkila et al. ......................... | 375/224 |
| 5,583,852 | 12/1996 | Ikeda et al. .............................. | 370/335 |
| 5,590,160 | 12/1996 | Ostman ..................................... | 375/367 |
| 5,590,409 | 12/1996 | Sawahashi et al. . | |
| 5,602,834 | 2/1997 | Dean et al. ............................... | 370/335 |
| 5,602,903 | 2/1997 | Leblanc et al. ........................... | 379/60 |
| 5,625,889 | 4/1997 | Chikkaswamy et al. .............. | 455/67.1 |
| 5,687,171 | 11/1997 | Shin et al. . | |
| 5,710,974 | 1/1998 | Granlund et al. . | |
| 5,828,658 | 10/1998 | Ottersten et al. ........................ | 370/310 |
| 5,862,124 | 1/1999 | Hottinen et al. ......................... | 370/342 |

FOREIGN PATENT DOCUMENTS 43 33 396 A1  4/1995  Germany .

*Primary Examiner*—Hassan Kizou
*Assistant Examiner*—Daniel Previl
*Attorney, Agent, or Firm*—Brown, Martin Haller & McClain

[57] ABSTRACT

A method and apparatus is provided for the overlaid operation of two or more wireless communication systems where one of the two systems is a small-scale or indoor system and the other is a large-scale or outdoor system. The indoor system monitors the operation of the outdoor system and detects which part of the available radio resources are temporarily not in use or interference-free in the outdoor system. The indoor system dynamically selects an unused outdoor channel for indoor operation. The indoor radio traffic is divided into TDD time slots with the slots being used for monitoring the existing radio communication on other outdoor channels so that fast changes according to changing traffic and interference conditions are possible. Synchronization, timing and phase control may be added to assist in the maintenance of an error-free communication network.

19 Claims, 15 Drawing Sheets

METHOD AND APPARATUS FOR OPERATING AN INDOOR CDMA TELECOMMUNICATIONS SYSTEM

CROSS-REFERENCES TO RELATED APPLICATIONS

This is a Continuation-in-Part of application Ser. No. 08/685,578, filed Jul. 24, 1996 now U.S. Pat. No. 5,864,549.

FIELD OF THE INVENTION

The present invention relates to the field of radio communication networks. Particularly, the invention relates to a method and apparatus for reducing interference between two radio communication networks that have overlapping areas of coverage and use the same range of radio frequencies.

BACKGROUND OF THE INVENTION

Mobile wireless communication technology has gained such widespread acceptance throughout many densely populated areas that the bandwidths of the radio frequency (RF) spectrum that have been allocated for mobile phone systems are rapidly approaching their capacities using existing analog technologies. This rapid approach of the bands' capacity is being hastened by the increased applications of wireless communications for data transmission, such as facsimiles and Internet access, and video transmission. Still another application of wireless technology that is creating capacity concerns is the use of wireless systems for local, relatively small scale networks which lie within the coverage area of larger public networks. Examples of such small scale networks include cordless links between detection/control instrumentation in an assembly line and a central data collection computer, or a wireless telephone system within an office environment, i.e., a local area network (LAN). The larger networks would include commercial cellular phone service providers. Although frequently referred to as an "indoor cellular network" or "indoor system", the second, small scale system need not be literally indoors. Alternatively, a small scale or indoor cellular communication system may be referred to as a "pico-cell," with the outdoor cellular communication system being referred to as a "macro-cell."

Digital technologies are being implemented in an effort to increase the subscriber capacity of the allocated bandwidths as well as to provide higher quality signals for transmission. These digital techniques, which include TDMA (time division multiple access), digital FDMA (frequency division multiple access), and code division multiple access (CDMA), share the same available channel capacity by creating a number of subchannels, each by a different method. In digital FDMA systems, simultaneous transmissions are separated by dividing the available frequency band into disjoint sub-bands. In such a system, interference due to the co-existence of large scale and small scale wireless communications networks in a common area could be addressed by assigning specific frequencies within the available band to the different networks, sacrificing portions of both networks' capacities in order to enable the overlap. In a TDMA system, the signals are divided into disjoint time slots, with a common time reference providing means for coordinating the elements of the network. By further coordinating the time references for the overlaid large scale and small scale networks, different time delays can be used to distinguish between the signals within the respective networks to avoid interference. Other solutions to distinguishing the signals from two or more at least partially overlapping FDMA or TDMA networks are known and will be apparent to those skilled in the art.

In analog, TDMA and digital FDMA wireless communications technologies, the indoor communications system may operate in a different frequency band than outdoor systems, requiring frequency planning and exclusive allocation of portions of the frequency band to each system. Frequencies that are exclusively allocated to a certain system but remain unused due to low traffic in that system represent a waste of available radio resources.

In a CDMA system, multiple subscribers each use a channel identified by a unique digital code. CDMA provides several advantages over conventional digital FDMA or TDMA systems. A significant advantage is that frequency spectrum allocation planning for mobile and base stations within cells of a CDMA system is not required. Consequently, the capacity of a CDMA system is potentially greater than that of a TDMA or FDMA system. Additionally, since the energy of the transmitted signals in a CDMA system is spread over the wide band uplink or downlink frequency band, selective frequency fading does not effect the entire CDMA signal. Further, path diversity can be exploited in a CDMA system but must be compensated in other systems. (A comprehensive overview of CDMA systems principles is provided in the book by Andrew J. Viterbi, entitled *CDMA: Principles of Spread Spectrum Communication,* Addison-Wesley Publishing, 1995.) The Telecommunications Industry Association/Electronic Industries Association (TIA/EIA) IS-95-A standard, which has been accepted as one basis of commercial cellular networks in the USA, describes some of the important technical characteristics of a CDMA-based cellular radio telecommunication system. In addition to the IS-95-A standard, there is another common air interface standard for CDMA which is used for PCS networks. This standard, designated as ANSI J-STD-008, applies to CDMA communications within the 1850–1990 MHZ frequency band. Both cellular and PCS CDMA systems have the same basic signal structures, i.e., message formats, coding, and modulation, and, thus, are similarly appropriate for implementation of overlaid communications systems.

A CDMA base station uses one or more carrier frequencies by spreading a plurality of independent transmission streams into a frequency band that is associated to each carrier. This spreading is accomplished by coding the transmission stream with a distinct spreading code. These spreading codes are orthogonal to enable each receiver to cancel out all signals other than the one it wants to receive. Orthogonality requires synchronization on the bit level between different transmission streams in the transmitter. Decoding a CDMA transmission requires that the receiver be able to synchronize itself into the transmitted sequence at the chip level, where a chip represents the length of one bit in the transmission.

In spite of its advantages, the absence of frequency allocation in CDMA systems poses a unique problem in dealing with geographically overlaid, or partially overlaid, networks which are operating within the same frequency band. The IS-95 standard does not place restrictions on the size of cells of a cellular network, thus allowing the operation of overlaid radio communication systems such as the large scale and small scale networks described above. In a CDMA system with overlaid indoor and outdoor networks, intersystem interference results when transmissions in one system appear at the receivers of the other system, causing errors and signal corruption. This problem arises most often due to the relatively higher transmission power of the Outdoor Mobile Stations (OMSs) and Outdoor Base Stations (OBSs) as compared to the Indoor Base Stations (IBSs) and Indoor Mobile Stations (IMSs). An attempt to overcome this problem by boosting the relative power levels of the indoor system would likely only result in increased interference with the outdoor system by the indoor system's transmissions.

Another obstacle to implementation of overlaid CDMA communication systems is a significant near-far effect. The near-far effect is typically caused by an outdoor mobile station transmitting at a high power from a location near either an indoor base or mobile station. This outdoor transmission causes the receiver within the indoor system to be overwhelmed by the strong outdoor signal, thus being unable to detect the lower power indoor signals.

It would be desirable to provide a system and method which would allow the effective sharing of the same frequency bands between overlaid CDMA-based indoor and outdoor radio communication systems while simultaneously preventing interference between the two systems.

SUMMARY OF THE INVENTION

It is an object of the present invention to provide a method for operating two separate CDMA systems which at least partially share the same coverage area and transmission frequency band systems in a way that minimizes intersystem interference between the two.

It is another object of the present invention to provide such a method which would at least partially utilize in the first CDMA system the multiple access features of the second CDMA system.

Yet another object of the present invention is to provide a first CDMA system which monitors a second CDMA system to identify any low-interference channels, or channels with low activity of the second system.

A further object of the present invention is to provide a dynamic channel selection feature which would dynamically optimize the channel selection in a first CDMA system to utilize channels of a second CDMA system which are experiencing low-interference or inactivity.

Still another object of the present invention is to provide a method for synchronizing multiple indoor systems to each other thereby avoiding a near-far effect from neighboring indoor system using the same frequency band for communication.

According to one embodiment of the present invention, a method is provided for arranging radio communication in a first CDMA-based communication system, which operates at least partially within the coverage area of a second CDMA-based communication system which operates within the same frequency band. This method uses a first frequency for downlink radio communication and a second frequency for uplink radio communication. Existing radio communication within the second communication system on at least one of the first frequency and second frequency is observed, and, based upon that observation, one of the first and second frequencies is selected. The first communication system then communicates on the selected frequency by dividing the selected frequency into cyclically occurring time slots, i.e., using a time division duplex (TDD) method.

According to another aspect of the present invention a method is provided for establishing a radio communication connection between a base station and a mobile station in a first radio communication system, which operates at least partially within the coverage area of a second radio communication system, which second radio communication system uses a first frequency range for downlink radio communication and a second frequency range for uplink radio communication and where the downlink communication channels of the second radio communication system on a certain frequency are separated from each other by code division multiplexing with a predetermined set of orthogonal spread codes. In this method, the base station is synchronized to the strongest downlink transmission from the second radio communication system. The frequency at which this synchronization occurs is selected as a reference for use by the first communication system. Within the base station, the decoded signal power associated with each orthogonal spread code of the reference frequency is measured. The general level of radio interference on the reference frequency is calculated by subtracting the sum of all decoded signal powers from the total received power. If the decoded signal power associated with a first orthogonal spread code is less than a first threshold, and if the general level of radio interference on the reference frequency is less than a second threshold, the reference frequency is selected. Otherwise, another frequency is selected and the above-mentioned steps are repeated until a frequency which meets the above criteria is selected. A pilot signal is transmitted at the base station using the selected frequency and the first orthogonal spread code. The signals associated with the orthogonal spread codes of the selected frequency are then decoded in the mobile station until the pilot signal is found. Finally, a signal is transmitted from the mobile station indicating that the pilot signal has been found.

According to a further aspect of the invention, a radio communication system for overlaid operation within the coverage area of another radio communication system is disclosed, where the radio communications system includes at least one base station and at least one mobile station. The at least one base station includes a detector for detecting and measuring transmissions of the other radio communication system, a means for deciding, on the basis of the measurement, which frequency, or frequency band, of the other radio communication system contains currently unused capacity, and a means for directing the radio communication between the base station and the mobile station to use the detected unused capacity of that frequency or frequency band.

The present invention provides the outdoor CDMA network the freedom to operate as if the indoor CDMA system did not exist. It is the responsibility of the indoor system to monitor which part of the common radio resources is left available by the outdoor system. The indoor system uses these available resources as long as the outdoor system does not need them. The decentralized model of the invention permits the co-existence of a number of separate indoor systems within the coverage area of the outdoor system. New systems may be introduced and old systems may be shut down without effecting the operation of the outdoor system, because of its stable nature.

An alternative embodiment of the present invention includes an indoor communication system which incorporates the same spreading bandwidth of an outdoor communication system operating within the same area. This indoor system operates simultaneously with, and is also substantially synchronous with, the outdoor system. Such synchronization may be difficult in a system having the mobile stations and base station located randomly within the outdoor system coverage area. To accomplish such synchronization, both the indoor mobile station, as well as the indoor base station, synchronize to the pilot signal of the outdoor base station. Such synchronization provides that any signal from the indoor base station arrives at the mobile station 90 degrees away from the interfering signal from the outdoor communication system. This 90 degree separation provides a large measure of isolation between the indoor and outdoor communication system.

Yet another alternative embodiment of the present invention includes a method of synchronizing neighboring indoor communication systems to eliminate an otherwise severe near-far effect. This synchronization method provides for the synchronization of two or more indoor communication system such that each system transmits, receives, and monitors at the same time. This avoids the problem which occurs when two mobile stations are adjacent, with the first mobile station transmitting to a first indoor base station, and the second mobile station receiving from a second indoor base station.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to parts, and in which.

DETAILED DESCRIPTION OF THE PREFERRED EMBODIMENTS

The following detailed description utilizes a number of acronyms which are generally well known in the art. While definitions are typically provided with the first instance of each acronym, for convenience, Table 1 below provides a list of the acronyms and their respective definitions.

TABLE 1

| ACRONYM | DEFINITION |
|---|---|
| ANSI | American National Standards Institute |
| CDMA | Code Division Multiple Access |
| DS-SS | Direct Sequence Spread Spectrum |
| FER | Frame Error Ratio |
| IBS | Indoor Base Station |
| IMS | Indoor Mobile Station |
| IF | Intermediate Frequency |
| IS | Interim Standard |
| OBS | Outdoor Base Station |
| OMS | Outdoor Mobile Station |
| PBX | Private Branch Exchange |
| PC | Power Control |
| PCS | Personal Communications Services |
| PN | PseudoNoise |
| PSTN | Public Switch Telephone Network |
| QPSK | Quadrature Phase Shift Keying |
| SNR | Signal to Noise Ratio |
| TDD | Time Division Duplex |
| TDMA | Time Division Multiple Access |
| WHT | Walsh-Hadamard Transform |

Figure 1:
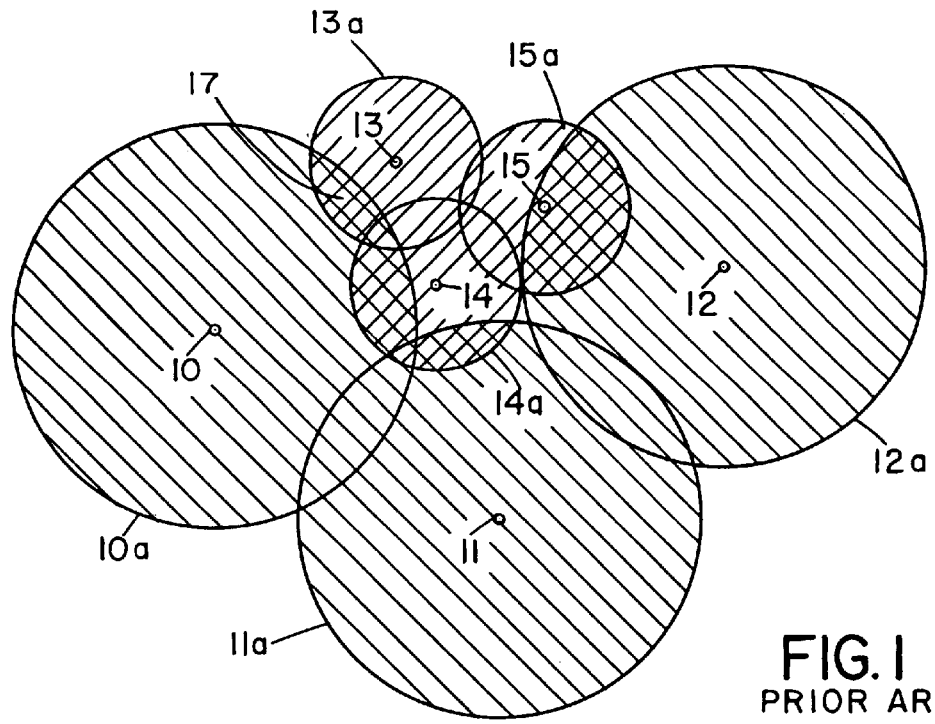
FIG. 1 illustrates the known geometry of overlaid operation.

Referring initially to FIG. 1, an exemplary situation where an indoor CDMA-based cellular network and an outdoor CDMA-based cellular network partially overlap is shown. Each Outdoor Base Station (OBS) 10, 11, 12 has a respective coverage area 10a, 11a, 12a. Also each Indoor Base Station (IBS) 13, 14, 15 has a coverage area 13a, 14a, 15a. The cross-hatched geometrical intersections 17 and 18 of the indoor and outdoor coverage areas indicate that there is an overlap, where a mobile station may receive transmissions from both systems. In some other configurations an indoor network may exist in an area that is completely covered by the cells of an outdoor system, resulting in a comprehensive spatial overlap. The proportional sizes of the coverage areas in FIG. 1 have been chosen for purposes of illustration only and do not imply any limitations on the actual or relative sizes of the respective areas or on the degree of overlap. Generally, the outdoor system has a much larger average cell size than the indoor system. Some proposed dual-mode mobile stations may be able to choose between the different systems on the overlap area, whereas a conventional single-mode mobile station that is only operable in one system regards the transmission from the other system as noise. In any case it is preferable that an OBS and an IBS do not transmit similar signals simultaneously on the same frequency, because in the absence of any multiple access methods it would be impossible to separate the two transmissions from each other in reception by an IMS.

The location of an OBS in relation to the IBS is fixed, so each time the OBS produces a radio transmission using a certain output power an IBS observer in the indoor coverage area will measure a signal having essentially a constant signal power level. Transmission power control algorithms in the OBS may cause it to use different output power at different times, but the disturbance it causes to the indoor system may be estimated using techniques known to those in the art. Such estimation is accomplished using mathematical approximations based on assumptions that neither the transmitter or receiver are mobile, and by analyzing prior and current interference measurements of the system. According to the transmission direction in the outdoor system this is called the forward link disturbance. On the other hand, since an OMS is by definition free to move in relation to any fixed observer, it may transmit from a location that is very close or even inside the coverage area of the indoor system. The OMS may also be at the outer edges of the outdoor coverage area, far from the indoor system. Additionally, the OMS has some output power control features. The strength of the reverse link disturbance thus caused to the indoor system is not easily calculable beforehand.

In a practical situation an observer in the indoor network 13 sees widely varying interference conditions on each two-way channel that comprises a forward (downlink) traffic channel and a reverse (uplink) channel. If the outdoor system temporarily does not use the two-way channel at all, there is no interference. An active but distant OMS produces only weak reverse link disturbance but relatively strong forward disturbance. The same holds for a nearby OBS. Conversely, a nearby OMS causes strong reverse link disturbance but only relatively weak forward link disturbance. Typically one component channel (forward or reverse channel) of the two-way channel has a much higher interference level than the other.

The present invention proposes that the indoor network monitors the interference level on a number of outdoor-based one-way component channels. When it detects a relatively undisturbed outdoor channel, it selects that channel to use for one of its own communication links between IBSs and IMSs. The indoor network continues to monitor the dynamically changing interference situation, redirecting all indoor-related communication from a channel with increasing outdoor-based interference to a more appropriate channel whenever necessary. As the interference situation in an outdoor-based two-way channel is asymmetrical as described above, it is preferred that the indoor system use the capacity of only the component channel that has the lowest interference level. For example, the indoor system can operate on either the uplink frequency band, or in the downlink frequency band, depending on which band has less interference. The indoor system will split the capacity of this originally one-way component channel between the indoor uplink and indoor downlink channels by means of time division duplexing (TDD) to permit transmission of a number of CDMA communication signals.

The present invention does not limit the channel selection of the indoor system. For example, it may use an outdoor forward channel, if simulation and/or practical experiments in a certain practical case show that the more structured and stationary forward link disturbance makes the outdoor forward channel always the most appropriate choice. Alternatively, the indoor system may use either the outdoor forward or the outdoor reverse channel frequency range depending on the changing interference conditions. It may even use regular channel hopping or fast-reacting dynamic channel changes, in the course of a communication, between the outdoor forward and outdoor reverse channels frequencies.

Figure 20:
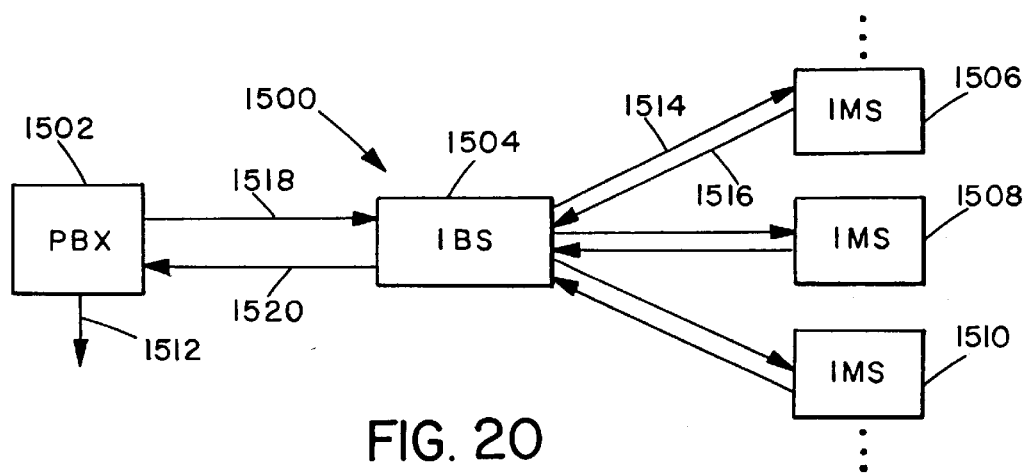
FIG. 20 is a block diagram showing a typical indoor telecommunication system, including an indoor base station communicating with a number of indoor mobile stations and a PBX system.

Referring now to FIG. 20 which is a block diagram showing a typical indoor wireless communication system, including an indoor base station communicating with a number of indoor mobile stations and a PBX system. The indoor base station is generally designated 1500, and includes a PBX (Private Branch Exchange) for access to local telecommunication lines, an IBS 1504, and a number of IMSs 1506, 1508 and 1510. As shown, each IMS communicates with the IBS via radio frequency transmission 1514 and 1516. In general, the communication link 1514 from the IBS to the IMS is called the downlink, and the communication link 1516 from the IMS to the IBS is called the uplink. In addition to the communication link between the IBS and the IMSs, there is also a communication link between the IBS and the PBX. This link, shown with links 1518 and 1520 provide communication capability from the IBS to surrounding telecommunications networks via connection 1512, such as the local telephone PSTN (Public-Switched Telephone Network). The PBX, however, is not a necessary component to system 1500, and is only included here to demonstrate the interconnectability between the indoor wireless system and a traditional wired communication system.

Figure 2:
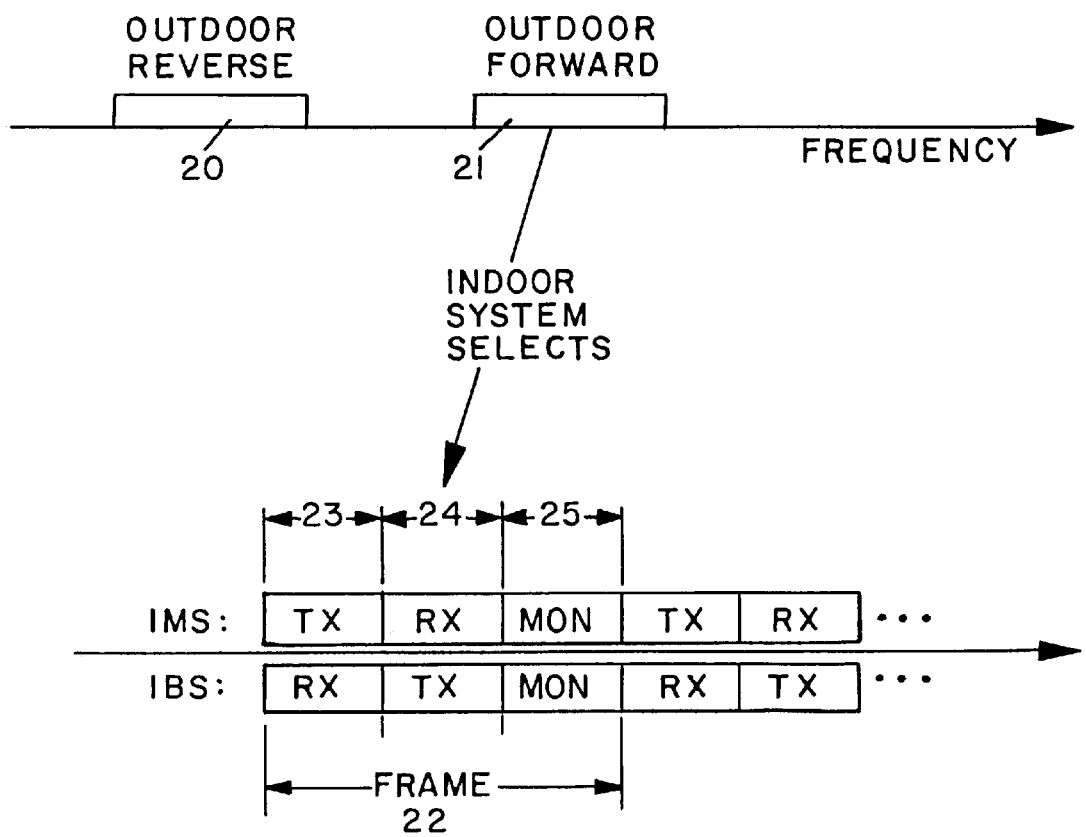
FIG. 2 illustrates a channel selection and time division process of the present invention.

FIG. 2 illustrates an exemplary indoor channel selection and organization according to a preferable embodiment of the invention. In a typical outdoor network the forward and reverse channels occupy different frequency bands each with a certain bandwidth. There is a separating frequency duplex interval between them. In such cases the discussion of outdoor forward and outdoor reverse channels above refers to the respective frequency bands 20 and 21 in FIG. 2. For example, assume that the indoor system has detected a suitably low interference level on the outdoor forward frequency band 21. As a result, it selects this frequency band for communication between an IBS and an IMS. To enable sharing of a single frequency band by the IBS and the IMS for uplink and downlink monitoring, the indoor system divides the communication time on the selected frequency band into consecutive frames of suitable duration, for example 20 milliseconds.

The lower part of FIG. 2 illustrates the temporal organization of communication in the indoor system, where a TDD (Time Division Duplex) method separates the transmission and reception at each station. A frame 22 is further divided into intervals or time slots 23, 24, and 25. During the first interval 23 in each frame, the IMS transmits and the IBS receives. During the second interval 24 in each frame, the IBS transmits and the IMS receives. Both stations use the receive and/or transmit intervals also for interference monitoring on the channel they are using. One way to monitor interference is by monitoring a particular channel during a time slot interval where the IBS or IMS are not transmitting. This interference is determined by subtracting the average decoded signal power from the total received power to obtain the average interference level in decibels.

Figure 19:
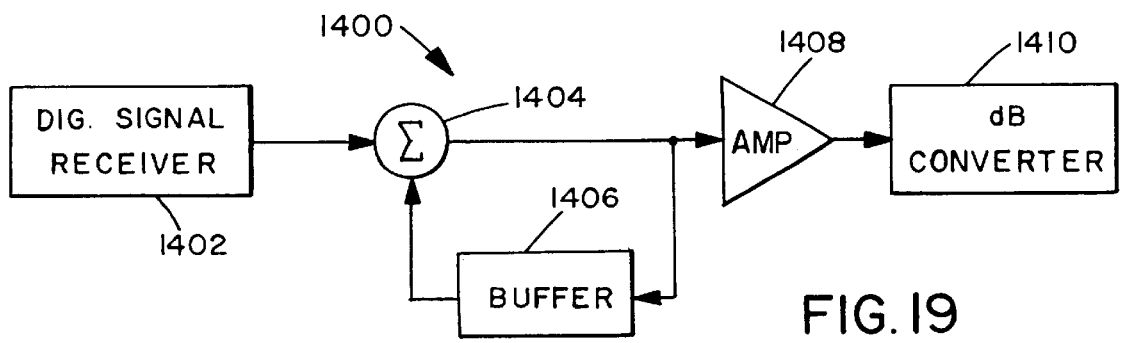
FIG. 19 is a block diagram showing the measurement device which is implemented in both the IMS and the IBS.

Referring to FIG. 19, a block diagram of the measurement device which is implemented in both the IMS and the IBS is shown and generally designated 1400. The monitoring, measurements and the dB conversions are performed in the measurement device 1400 during the monitor time interval 25 as shown in FIG. 2. In measurement device 1400, a digital signal is received into receiver 1402 where it is decoded into a time averaged binary serial data stream and input to summer 1404. The output of summer 1404 is fed back into the summer 1404 through buffer 1406. Buffer 1406 should have a delay period sufficiently long to accommodate a maximum of N measurements, where N varies depending on the signaling scheme selected. This effectuates a statistical averaging which is then fed from summer 1404 to amplifier 1408. Amplifier 1408 will have a gain on the order of 1/N, which serves to decrease the level of the signal from summer 1404 to a level corresponding to an averaged single measurement value. The output from the amplifier 1408 is then fed to a dB converter 1420 where the signal is multiplied, in this example, by a 20 log multiplier which provides the dB value of the signal measurement. The measurement itself is performed throughout the monitoring slot and thus more than one sample is monitored. This results in the output of device 1400 being an average of all the measurements which were performed during a single monitoring time slot.

Referring again to FIG. 2, during the third interval 25 in each frame, at least one of the stations but preferably both stations monitor the interference levels on a group of alternative channels, which are candidates for possible usage. The purpose of the monitoring interval 25 is that at least one of the stations, preferably both stations, may continuously look for a more suitable frequency band from among the candidate frequencies. The interference level on other channels is equal to the total received signal power on that channel, averaged over a certain time period. The lengths of all averaging periods may be system parameters which the IBS may set by including them into a general broadcast message or a control message directed at a certain mobile station or a group of mobile stations.

In an embodiment where both the IBS and the IMSs monitor the interference levels on candidate channels, it is beneficial that they combine their measurement results regularly for comparison. The IMSs shall report their measurements to the IBS for example through signaling on some low-rate signaling channel. Based upon IMS reporting and its own measurements, the IBS makes the decisions to choose the currently best channel for use. If the interference level on the current channel increases during a call connection, for example, due to increasing outdoor transmission activity, the IBS initiates a handoff of the indoor user to another channel from the candidate channels where the interference is lower. If the channel needs to be changed during idle mode, the IBS announces to the IMS the new channel in a paging message, which is assumed to transmit periodically according to the general principles of radio networks.

The definition of a frame and its organization into intervals is presented in FIG. 2 as an example only, and the order of the intervals as well as their sizes in relation to each other may be widely varied. Guard intervals may be introduced between the transmission and reception time slots to prevent simultaneous transmission from both stations. Other intervals may also be defined and included in the frame structure, for example for the exchange of control messages and signaling between the two stations. Signaling is more frequently carried out on a separate signaling frequency that is internal to the indoor system.

In another embodiment of the present invention, the indoor system reuses some of the CDMA multiple access codes that are not being used on a chosen outdoor forward carrier signal for a given moment. In the absence of multipath propagation, the signals transmitted by an OBS are orthogonal. Each of these signals is spread with one of 64 spreading codes. Typically only a subset of all possible independent transmission channels (or spreading codes) are in use since the downlink cannot accommodate 64 users, which is the theoretical maximum according to the IS-95 standard. This is due to the SNR limitations inherent in a CDMA system, as well as the necessary utilization of at least some of the codes by paging and pilot codes. Practical scenarios propose a typical amount of 10–20 simultaneous users on a single carrier. Thus a significant number of orthogonal channels is available for other use.

In order to keep the outdoor system orthogonal to the indoor system all signals that an IBS or an IMS receives will ideally be perfectly synchronous. However, in practice, some imperfection must be allowed. The aim is to calculate the necessary transmission delays at each indoor transmitting station so that their transmissions arrive at the receiving station in synchronization with each other and with the simultaneously ongoing outdoor transmissions from a nearby outdoor transmitting station. The IMSs are located in different places and, in general, the impulse response from the particular OBS to these indoor locations is different. Therefore the IBS controls the delays of all indoor downlink channels separately. This means that the downlink signals transmitted indoors cannot be orthogonal because Walsh codes, which are commonly used as spreading codes in CDMA, are not orthogonal if asynchronous. As is known in the art, a Walsh code is one of a set of orthogonal waveforms, based on the Walsh-Hadamard matrices. Walsh codes are used for two purposes in CDMA—in the forward link, they are used as orthogonal cover to create independent transmission channels. In the reverse link, they are used as orthogonal modulation. However, this should not be a significant problem since most of the interference comes from outdoors, and power control and/or multi-user detection methods which are well known in the art can be applied for the indoor signals. For indoor uplink, the problem of synchronization is easier to solve because there is only one IBS serving a multitude of IMSs and each of them may calculate the necessary transmission delays so that their uplink transmissions arrive synchronously at the IBS.

The implementation of the proposed synchronization scheme is as follows. When the indoor system analyzes the possibility of using a particular outdoor forward frequency or RF channel from among the candidate frequencies or channels, each IBS attempts to synchronize with the most powerful OBS signal it receives. The pilot code of the OBS can serve as the synchronization basis and the strongest outdoor signal component is taken for reference in a multipath situation. After achieving the synchronization the IBS measures the signal level at the output of its Walsh Hadamard Transform (WHT) block for each of the employed Walsh functions of which there are 64 according to the IS-95 standard. Based on the measurement results, the IBS decides which orthogonal code (or which subset of orthogonal codes) can be used for this indoor cell if the identified RF channel is selected. Low measured power associated with a Walsh function indicates that the function is not in use.

In addition to the code usage analysis, the selection process at the IBS includes a measurement of the general RF interference level on the identified RF channel. The IBS calculates the general RF interference by subtracting the sum of all signal powers at the output of the WHT from the total received power. If the interference level thus obtained is lower than a preselected threshold value, the IBS selects the identified RF channel for use. All transmission and reception will then take place by using the Walsh codes that were unused in the outdoor system. The selected usable orthogonal codes may vary from time to time and the IBS will inform the IMSs when this happens. In an alternative embodiment each IMS may also maintain a list of suitable unused candidate channels, whereby the choice of a channel is always a result of negotiation between the IBS and the IMS concerned. A preferable negotiation procedure starts by a channel proposal sent by one of the stations and continues by an Acknowledged (ACK) or Not acknowledged (NACK) message from the other station. The maintaining of lists of candidate channels in both IBS and IMS has the advantage that the effort for finding the optimal frequency and a code is at least doubled compared to the alternative where the IBS alone makes the selection.

An alternative to the selection and maintenance of a sub-set of unused codes is to employ code hopping. A predetermined code hopping pattern is employed once the IMS has set up an active connection with the IBS. An important advantage of this alternative embodiment is that the IBS does not need to update the sub-set of usable codes.

The pilot signal of the IBS is an inherent feature of an IS-95-based CDMA system. It is an unmodulated, direct-sequence spread spectrum (DS-SS) signal transmitted preferably continuously by each IBS. The pilot signal allows a mobile station to acquire the timing of the forward CDMA channel, provides a phase reference for coherent demodulation, and provides a means for signal strength comparisons between base stations for determining when to handoff. According to one embodiment of the invention, the pilot signal of the IBS uses one of the selected orthogonal codes and the IBS may dynamically associate its pilot signal with a different code. The IMSs should decode all 64 Walsh functions in order to find the IBS's pilot signal, which carries the unique identification code of the IBS to facilitate its finding. It is not necessary for the IMS to decode all 64 Walsh codes since the OBS pilot signal will have a designated Walsh code, in the same fashion as that of IS-95. This OBS pilot Walsh code designation may be static, i.e. permanent assignment of the Walsh code O, or dynamic assignment. If there is a powerful OBS's pilot signal also present, it may be helpful for the IMS to first achieve synchronization with the outdoor pilot and only then lock onto the IBS. In operation, when the indoor system is first installed and powered on, it will coarsely align itself with the strongest outdoor system. Because of this "coarse" synchronization of the IBS with the OBS, it is helpful if the IMSs also align themselves with the OBS. This effectively minimizes the frequency "window" which the IMS must search to find and to become synchronized with the IBS. This minimal synchronization between the IMS and the IBS is often called a "fine" synchronization. In addition to the initialization synchronization between the IMS and the IBS, the IMS re-synchronizes itself to the IBS at the start of an indoor communication signal.

According to the IS-95 standard, the base stations of the outdoor system are identified by different pilot PN (PseudoNoise) sequence offsets. To reduce the need for intersystem administration, the same pilot PN sequence offsets could be used freely in the indoor systems. However, if the pilot PN sequence offset of an IBS is the same as that of an OBS, there exists a possibility that an OMS will become confused and lock onto an indoor pilot signal. Another embodiment of the invention therefore employs a code hopping pilot signal in the indoor system with a fixed and known code hopping pattern. Such a code hopping pilot should serve at least for the handoff purpose. If the code hopping pilot has sufficiently good signal quality, it can also provide phase reference for coherent detection. If not, the phase reference may be implemented by a discontinuous pilot signal consisting of phase reference symbols multiplexed onto used traffic channels (this would produce about 1–5% signal overhead). Both the code hopping and discontinuous pilot signals may be used simultaneously. The code hopping pilot would naturally avoid all channels that would disturb the operation of an outdoor system, such as the Walsh code O outdoor pilot signal, possible paging channels and so on. Yet another possibility is to use a completely different pilot sequence indoors, e.g., a long PN code that is different from those used in the outdoor system or a short code taken from a Kasami or gold set. A gold code is a code that is generated by adding, modulo two, the outputs of two spread-spectrum code-sequence generators. OMSs would certainly not lock to the pilot signal thus produced, because the new kind of code generators would only operate in IMSs, and would be unfamiliar to an OMS.

If the synchronization fails, i.e., the IMS is not in synchronism with both base stations, the IMS will not be able to establish a connection with the IBS since the interference level is too high on the RF channel. The IBS is assumed to page the IMSs regularly and request responses to the paging message in order to ensure that the connection is functional at all times. When an IMS fails to respond, the IBS assumes that there is a synchronization problem, aborts the current RF channel and makes another selection from the candidate channels.

When the IMS is in idle mode, i.e. it has no call connection with the IBS, the responsibility of regularly monitoring the interference level on different channels is on the IBS. The IMS will only perform the monitoring after each paging.

The IMS must have a power-on procedure to ensure location of the IBS's transmission. The default RF channel is preferably the one that was in use when the IMS was switched off. If it is not available, the IMS monitors a predefined set of candidate RF channels, which set may be organized according to the prior use of the RF channels. The set may also be an expanding arrangement of RF channels in which the IMS first monitors a relatively small set of previously used RF channels and extends the search to more rarely used RF channels if necessary.

The CDMA IS-95 standard may well serve as the basis for the radio interface in an overlaid indoor cellular network according to the invention. However, the Time Division Duplex (TDD) method that defines the transmission, reception, and monitoring intervals in a frame requires that the transmission times should be reduced to only a fraction of the original transmission times in an IS-95 network. One possibility is to reduce the processing gain of an IS-95 forward link by a factor of three, so that the transmission and reception times may be shortened to one-third of the original. Stated differently, when the processing gain is decreased by a factor of three, which can be easily affected by a modification of the duplexing scheme, the transmission rate must be increased. In an indoor communication system where the TDD time slot is 20 milliseconds in length, the indoor system must have an increased transmission rate to effectively transmit the same data per unit time. Thus, to send the same amount of information in a TDD indoor system, the signaling rate of the indoor system must be increased, resulting in a corresponding decrease in the processing gain.

The modified IS-95 forward link may be used for both forward and reverse links indoors. This solution applies to the preferred embodiment described above, with the indoor TDD frame divided into three equal intervals for transmission, reception and monitoring. The present invention does not limit the method through which the reduction in processing gain is achieved. A suitable method is for example to puncture the output of a symbol repetition stage in each transmitting apparatus. This method is described with reference to FIGS. 3 and 4, where the same reference numbers are used for counterpart blocks. Puncturing codes, which are rate ½ convolutional codes that take a 9.6 kbps information signal up to a 19.2 kbps information signal, are used. The output from the convolutional code with a rate of ⅔ to yield a signal of 14.4 kbps. In other words, one out of three samples from the convolutional coding is discarded to yield the 14.4 kbps signal. (Such convolutional coding methods are well known in the art. See, e.g., M. K. Simon, et al., *Spread Spectrum Communications Handbook* (Revised Edition), 1994, McGraw-Hill, Inc.)

Figure 3:
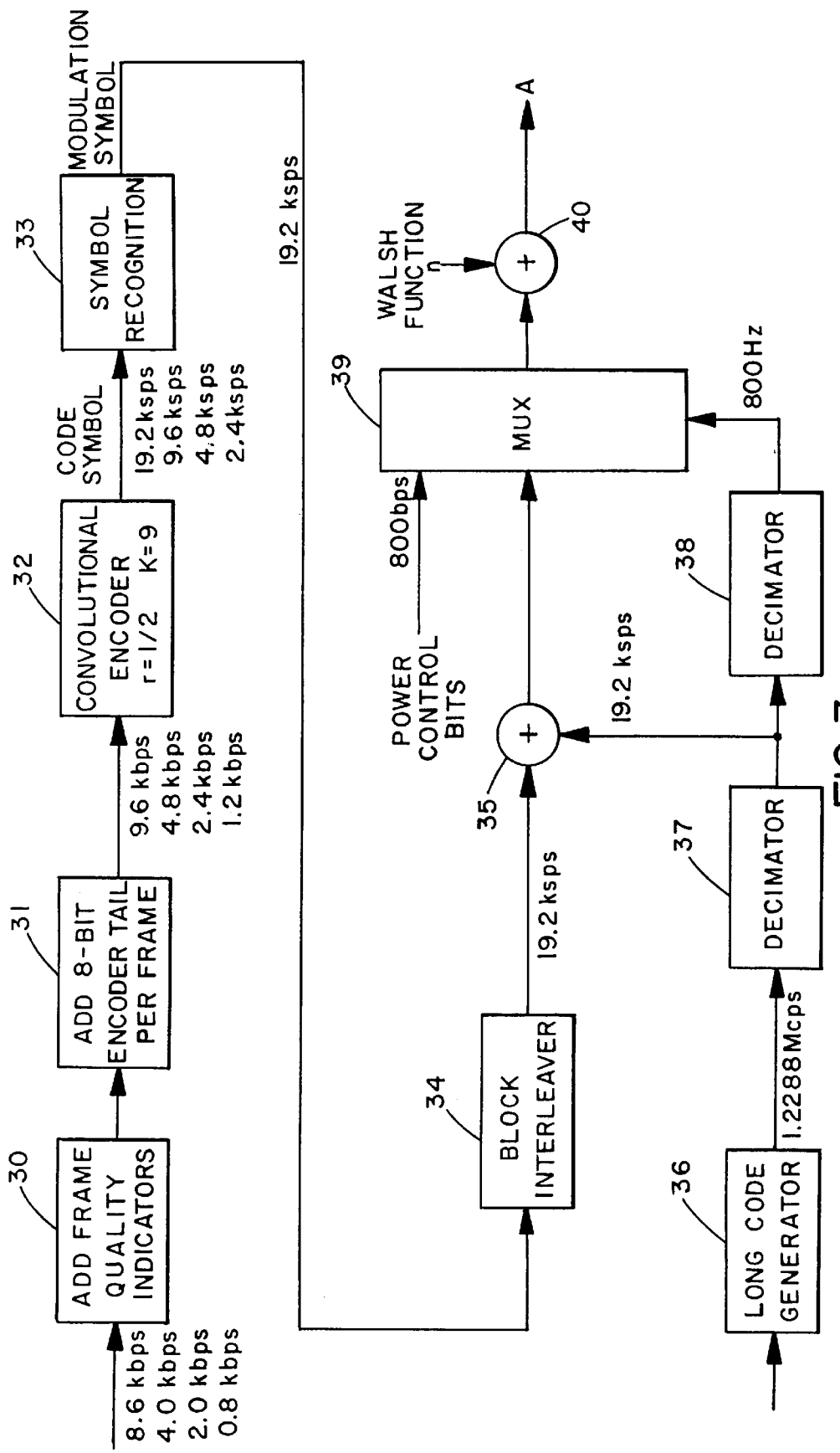
FIG. 3 is a block diagram of a known IS-95 transmitter section.

FIG. 3 illustrates the blocks that take part in the traffic channel information processing in a prior art IS-95 transmitter, with Rate Set 1 (user bit rates 8600, 4000, 2000 and 800 bps). Block 30 adds frame quality indicator bits to each user frame on the 8600 and 4000 bps user bit rate. A user frame is a concept of the IS-95 standard and is completely different than the TDD frame according to the invention and illustrated in FIG. 2. Block 31 adds an eight-bit Encoder Trail to each frame. At this stage the bit rates are 9600, 4800, 2400 and 1200 bps. The convolutional coder block 32 performs a convolutional encoding operation with a code rate of ½ and a constraint length of 9, resulting in code symbols with symbol rates of 19.2, 9.6, 4.8, and 2.4 ksps. Thereafter a symbol repetition block 33 produces an even symbol rate of 19.2 ksps by repeating each of the lower data rate symbols as many times as it takes to raise the symbol rate to the required value. The resulting modulation symbols are block interleaved in block 34 and scrambled in adder 35 with the help of a long code generator 36 and a decimator 37. A further decimator 38 and a multiplexer 39 are used to multiplex the data stream with the information on the power control subchannel and the result is code spread in adder 40. The data stream at point A is further lead to quadrature spreading, filtering, and upmixing, which are not shown in the Figure. The whole procedure is described in detail in chapter 3.1.3, "Modulation Characteristics", of the IS-95 standard.

Figure 4:
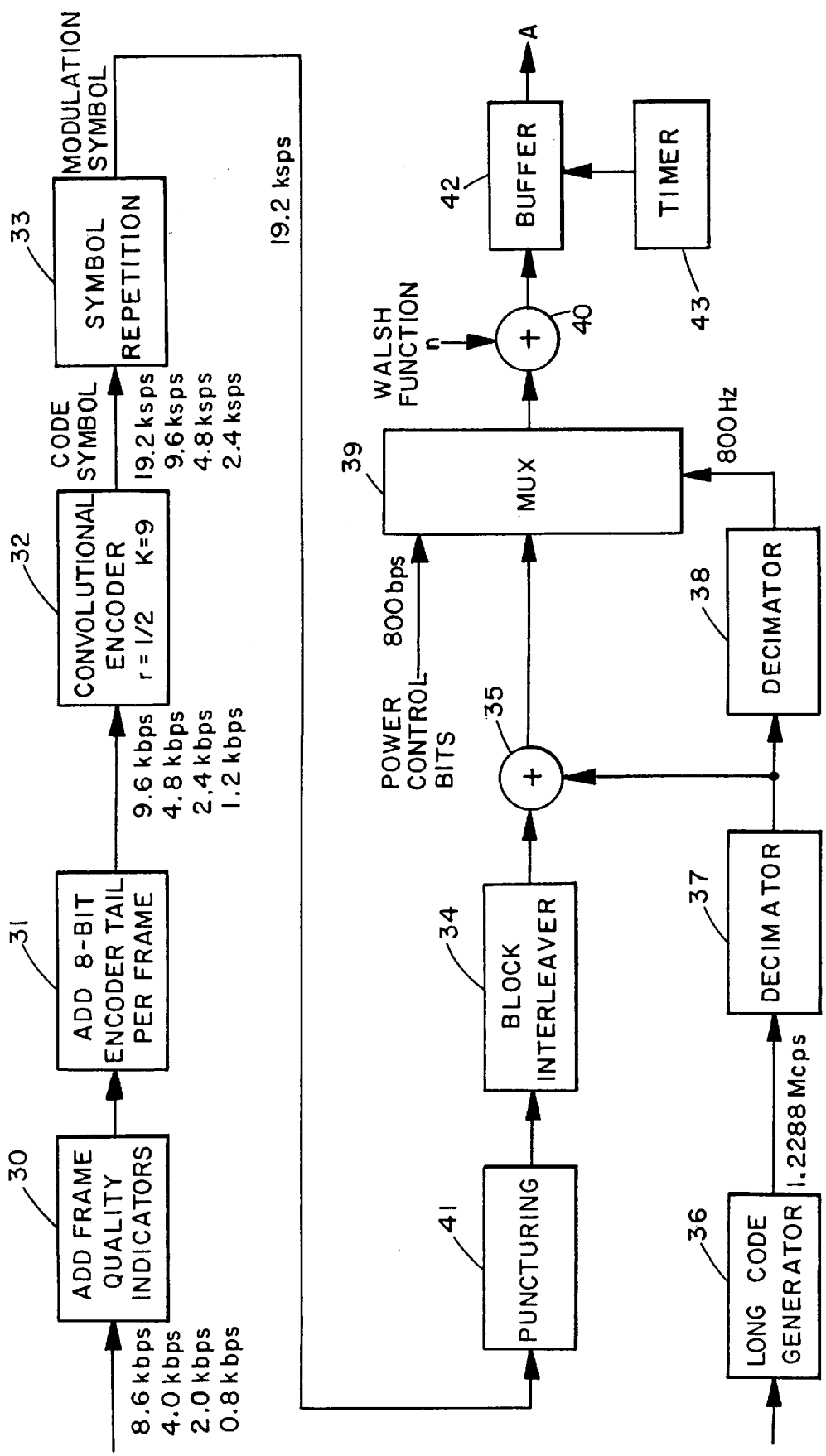
FIG. 4 is a block diagram of a transmitter section according to the present invention.

In FIG. 4, the operation of the blocks 30–40 is the same as in the description above. A puncturing block 41 has been added between the symbol repetition block 33 and the block interleaving block 34. Puncturing means that a predetermined deletion pattern is repeatedly applied to delete some of the symbols from the data stream. The effective code rate is the rate of the convolutional code divided by the puncturing rate (the latter is defined as the ratio of passed symbols to the total number of symbols per unit time). By selecting a suitable puncturing rate and choosing an appropriate length (for example 32) of Walsh codes for the code spreading operation in adder 40 the effective processing gain may be lowered to the desired value. In addition to the blocks described above FIG. 4 shows a buffer 42 and a timer 43 which enable the transmission during only those time slots that are allocated for transmission by the TDD control of the indoor system. Transmitting in cyclically occurring bursts in certain allocated time slots is known from previous TDD and TDMA systems. From point A the signal is again lead to quadrature spreading, filtering, and upmixing, which are done in the conventional manner. Both puncturing and buffering are signal processing operations known in the art, however, the method of combining them to an otherwise IS-95-conforming transmitter to produce the TDD embodiment of the present invention is an important aspect of the invention.

A significant advantage of the method and radio communication system according to the present invention, when compared with prior art, is that the system parameters of the outdoor and indoor systems are kept as similar as possible. For example, frequency bands are at least partially the same, system clocks work similarly, data structures and signaling structures are the same. Because of the single-frequency-TDD nature of the indoor system, OMSs cannot operate as visiting indoor mobile stations, however, this does not present a significant problem since, in an overlaid configuration, the OMSs may at all times communicate with OBSs. If a telephone communication between an IMS and an OMS is desired, it may be routed through both networks, regardless of whether the OMS is physically visiting an office where the indoor system operates.

Because the invention significantly alleviates the problem of outdoor noise interfering with the indoor network, the average transmission power that is required of IBSs and IMSs decreases. This has the effect of reducing intrasystem interference, i.e. the noise caused to indoor communications by other indoor communications. Additionally the lowered average transmission power saves energy so that the batteries of IMSs last longer.

Figure 5:
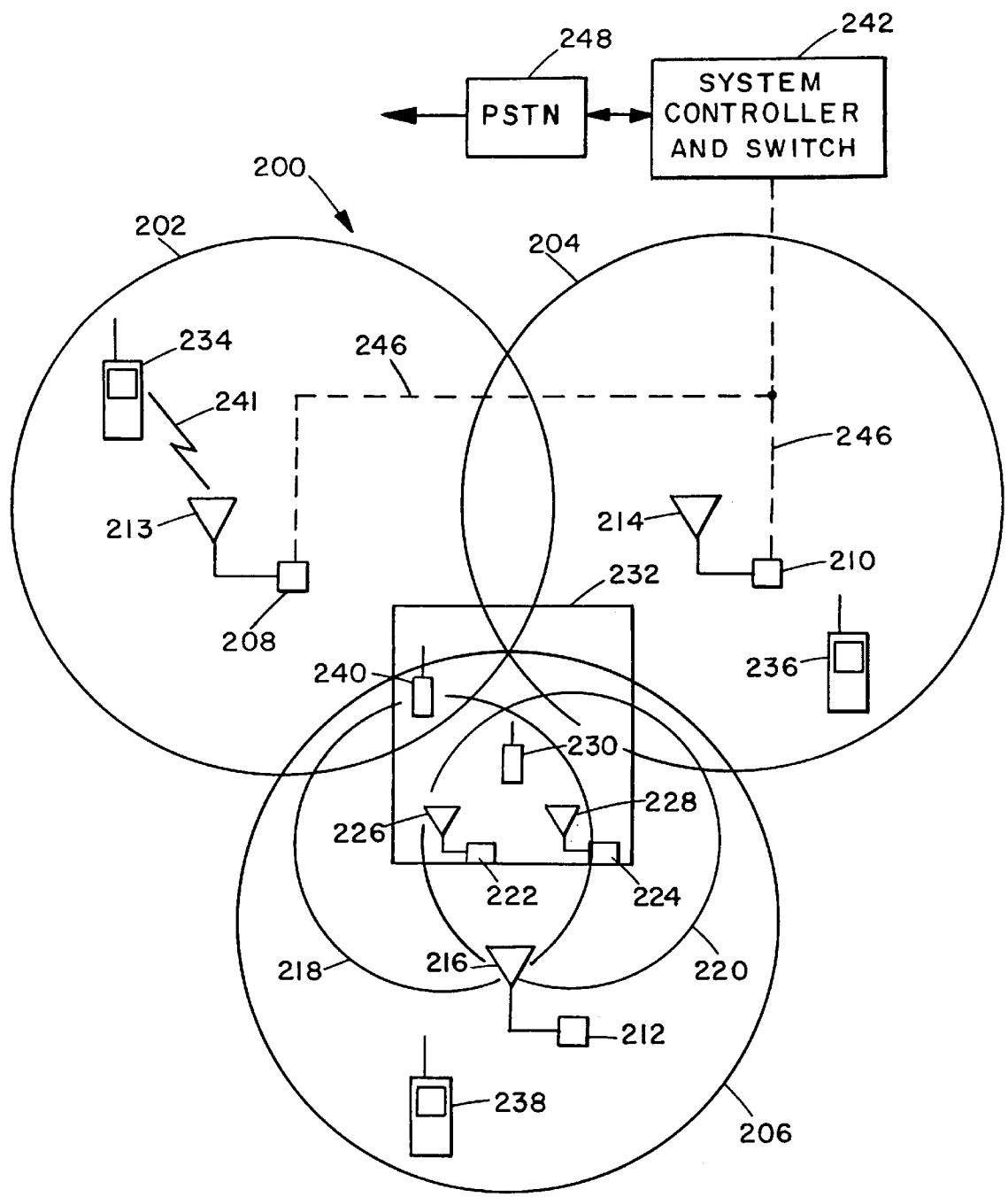
FIG. 5 is a diagram of an overlaid communication system having three outdoor, and two indoor base stations, and associated mobile stations.

Referring now to FIG. 5, a diagram of an overlaid communication system having three outdoor, and two indoor base stations, and associated mobile stations is shown and generally designated 200. System 200 includes outdoor cells 202, 204, and 206, which are overlaid on top of indoor cells 218 and 220. Cell 202 includes a outdoor base station (OBS) 208 having an antenna 213, and an outdoor mobile station (OMS) 234. Similarly, cell 204 and 206 have OBSs 210 and 212 having antenna 214 and 216 which communicates with OMSs 236 and 238, respectively. This diagram represents the coverage areas of the cells 202, 204 and 206. Although these cells are shown having a circular coverage area, it is to be appreciated that typical area coverage diagrams depict a hexagonal coverage area, with the transitions between cells being linearly defined borders. While these hexagonal maps are perhaps simpler to view, the coverage area is circular in nature, with the peripheral portions of coverage varying as a function of terrain, obstacles, and the like. Thus, FIG. 5 accurately represents the overlapping nature of coverage of adjacent cells. In addition, it is possible to affect a transfer from one cell to another, called a hand-off. Such a transfer is well known in the art (see, e.g., Viterbi, cited above) and, consequently, is not discussed in detail here. The handoff can be between the outdoor and indoor network, however, the ability to handoff between indoor systems, or between an indoor system and an outdoor system is not a necessary feature of the present invention.

Near the intersection of coverage between the three cells 202, 204, 206, a building 232 is located which houses a pair of indoor base stations (IBS) 222 and 224, having antennas 226 and 228, respectively. Within the coverage area of both cell 218 and 220, indoor mobile stations (IMS) 230 and 240 are shown. The IMS 230 is exposed to various signals from IBS 222 and 224, as well as OBS 212. This results in a significant problem in a situation where all three base stations are using the same frequency or frequency band. Moreover, the problem is only worsened when the communication protocols and standards vary between the different communication systems.

A subscriber to communication services which are provided by the operator of an outdoor communication system, may use an OMS 234, or mobile phone, to make and receive phone calls over a radio interface, such as shown by radio interface 241 between OMS 234 and OBS 208, as the subscriber moves through the coverage area of cell 202. Each of the OBSs provide coverage over a separate area, and are connected to system controller and switch 242 by connections 246, as in a conventional cellular system. System controller and switch 242 is connected to a public-switched telephone network (PSTN) 248 to allow subscribers of system 200 to make and receive phone calls from a land-based telephone network. The indoor system can also be connected to a system controller and switch (not shown) which can selectively connect the indoor system to a PSTN system.

In order for the present invention to be most effective, the indoor and outdoor systems should be based on a similar design, having similar system parameters, frequency bands, system clocks, data structures, signaling structures, i.e., as many similarities between the two systems as possible, with the exception of transmitting power. For example, an outdoor communication system may require a maximum mobile station transmission power level of 200 mW, and may operate according to the Telecommunications Industry Association/Electronic Industry Association (TIA/EIA) IS-95 standard for CDMA cellular systems, using an uplink frequency (F2) band 1.25 MHZ wide and centered at 847.74 MHZ, and an downlink frequency (F1) band 1.25 MHZ wide and centered at 892.74 MHZ. An IBS typically operates at a maximum transmission power of 50 mW, and the IMS typically operates at a maximum transmission power between 10–40 mW. In a CDMA PCS system, similar relative power relationships may exist between microcells in indoor and outdoor systems, however, the uplink frequency (F2) assignments are 50 kHz wide, distributed between bands A–F (1850–1910 MHZ), and the downlink frequency (F1) assignments are 50 kHz wide distributed between bands A–F (1930–1990 MHZ), with both uplink and downlink frequencies having particular channel numbers assigned as preferred frequencies according to the ANSI J-STD-008 standard. Generally, both CDMA standards provide for on the order of 42 channels distributed amongst six bands. For purposes of this description, the terms "frequency", "candidate frequency", or "preferred frequency" may be used interchangeably to refer to a frequency band, a frequency channel, or an individual frequency, the applications of which should be apparent to one skilled in the art.

In an embodiment of the present invention, such as shown in FIG. 5, a telecommunications network including an indoor CDMA system and an outdoor CDMA system is provided. The outdoor CDMA system may be a cellular system that includes a number of OBS 208, each covering a geographical area, or cell 202, within the outdoor system. Users of OMSs 234 registered in the outdoor system may move through the cells of the system and make and receive phone calls through the base stations and the public phone network 248. The indoor CDMA system may be a cordless system located within a home or business area that is located, wholly or partially, within the coverage area of a cell of the outdoor system The cordless system may include an IBS 222 base station connected to a land line of the public switched telephone network (PSTN). Users of a cordless handset may move within the coverage area of the cordless system and make and receive phone calls through the indoor base station and PSTN. Alternatively, the indoor cordless system may be connected to a switching center of the outdoor CDMA system.

As in previously-described embodiments, the outdoor and indoor systems operate within the same frequency spectrum and have the same bandwidth spreading factor. The outdoor system operates on a set frequency (F1) of the frequency spectrum for downlink, or forward link, communications, and a set frequency (F2) of the frequency band for communication uplink or reveres link. The indoor system is operated by time division duplexing (TDD) its indoor downlink and uplink communication on either F1 or F2. When monitoring F1, individual interference levels for all candidate orthogonal Walsh coded channels are measured and the IBS then selects a preferred channel from the results of the monitoring of F1 and F2.

If the OBS forward link is chosen by the IBS, the IBS then synchronizes to the OBS having the strongest pilot channel signal on F1, and selects a Walsh channel having a sufficiently low received power level from the forward link of the OBS to which it is synchronized. The IBS then uses the selected Walsh code for its pilot channel. The IBS also transmits a unique identification code that identifies the IBS on the pilot channel. When a call is initiated at the IMS or the IMS is paged, the IMS scans and decodes all possible Walsh codes to locate the unique identification code and to locate the correct Walsh channel on which to implement a connection. As an alternative to the IBS selecting the Walsh channel, specific Walsh codes may be assigned for use within the indoor and outdoor systems which allows them to operate in a coordinated manner.

Once communication has been established, the indoor system begins TDD transmission using the selected Walsh channel for both the transmit and receive time slots. The indoor system also periodically monitors the unelected candidate Walsh channels on F1 and F2 by utilizing a monitoring time slot allocated within the TDD scheme. According to the monitoring results, the indoor system may select a new Walsh channel from the candidate channels on F1, or change to F2. As an alternative to periodically monitoring the unelected Walsh channels and selecting a new Walsh channel, the indoor system may use a predetermined code hopping pattern to change the Walsh channels being used.

If the OBS reverse link is chosen by the IBS for F2, a Walsh code is chosen for the pilot channel of the IBS. The Walsh code chosen may be uniquely assigned to the indoor system or, if the indoor cordless system is connect to and controlled by a switching center of the outdoor system, the Walsh code may be one dynamically assigned between the indoor and outdoor systems by the switching center on a non-interfering basis.

Referring back to FIG. 2, the IS-95 system for CDMA usage was described including the monitoring of the outdoor communication system in order to select a frequency or frequency band from a set of candidate frequencies which is not exhibiting a high degree of noise, or is substantially unused. Whatever the selection means used, the channel spacings and frequency bands, as well as the guard bands, should be consistent between the two communication systems. Adherence to the IS-95 standard or other appropriate standard between both the indoor and outdoor systems will facilitate such communication.

In the example of a CDMA system in accordance with the IS-95 standard, the TDD system described in conjunction with FIG. 2 may be achieved by reducing the processing gain of the IS-95 forward link within the indoor communication system such that the transmission and reception times are shortened by a factor of three, and to use that modified IS-95 forward link for both the indoor forward and indoor reverse links. Such a modification will provide for the TDD transmission time slot 23, receive time slot 24, and monitor time slot 25, as shown in FIG. 2. As shown, the three time slots 23, 24, and 25 are equal in length, however, each time slot can have a distinct duration, providing for a more unidirectional data transfer, instead of a bidirectional transfer as shown in FIG. 2. For example, a transmit time slot is 160 bits in duration, a receive slot is 160 bits in duration, and a monitor slot is 60 bits in duration.

In general, each frame 22 in FIG. 2 represents 20 milliseconds in a TDD communication cycle. The indoor TDD communication system can use the frequency band of either the forward or the reverse link of the outdoor system. This selection is dependent upon the location of the strongest signal received by the indoor system. As a result, it is beneficial for both the IMS and the IBS to at least periodically monitor the condition of the frequency or frequency band selected because of the uncertainty that a particular frequency, or channel, which appears unused to the IBS, may actually be highly used in the vicinity of the IMS. For example, referring to FIG. 5, an IMS 240 could be positioned such that a particular channel which is currently in use within cell 220 by IBS 224 would appear to be unused, whereas the IBS 222 which is communication with IMS 240 would appear unavailable due to the communication traffic from IBS 224 and IMS 230. This situation can also occur with respect to the OBS signals. For example, a signal generated by OBS 208 will be received by IMS 240, but will not reach IBS 222. As a result, the frequency band or channel used by OBS 208 will appear unused to IBS 222, and unavailable to IMS 240.

In addition to the monitoring of the frequency bands for a substantially interference-free communication channel, both the outdoor downlink and the outdoor uplink frequency bands may be used. This alternative is particularly useful when an OMS is within the indoor cell, or when an IMS is adjacent an OBS. For example, referring to FIG. 5, it would be advantageous to use the downlink frequency band in the event that IMS 240 is adjacent OBS 208, thereby experiencing a large amount of interference. This interference is particularly destructive because the higher power level of the OBS 208 would overpower the signal from the typically lower-powered IBS 222. In this case, use of the uplink frequency band would effectively prevent exposure of the IMS 240 to the high-power signal from the OBS 208. However, if OMS 236 is located closer to cell 220, transmission in the uplink frequency band from OMS 236 to OBS 210 would contain sufficient signal strength to disrupt communication in the uplink frequency band between IMS 230 and IBS 224.

The indoor TDD system may incorporate either a static frequency band selection, or a dynamic selection such as hopping between the outdoor uplink and downlink frequency bands. In a dynamic frequency band selection system, both the IMS and IBS would have to monitor the uplink and downlink frequency bands. To accomplish this, it would be possible to alternate monitoring between the uplink frequency band during one frame 22 as shown in FIG. 2, then monitoring the downlink frequency band during the subsequent frame. In this manner, it would be possible to monitor the available frequency bands without loss of the sensitivity that might result from insufficient monitoring. For example, both the uplink frequency band and the downlink frequency bands can be monitored for a sufficient period of time to ensure an accurate measurement.

Figure 17:
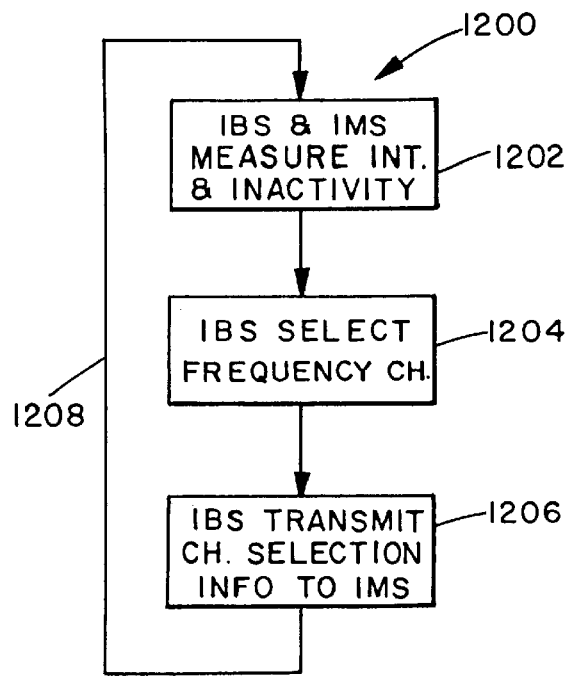
FIG. 17 is a flow chart detailing the method for dynamic frequency selection.

The method for dynamic frequency selection is shown in FIG. 17 and includes a flow chart generally designated 1200. Flow chart 1200 begins with step 1202 where the IBS and IMS measure the interference and activity on available RF frequencies or channels within both the uplink frequency band and the downlink frequency band. From the results of the interference and activity measurements, the IBS in step 1204 selects the frequency, or frequency band, that exhibits the lowest interference levels. In general, the interference level on an RF channel, including the uplink and downlink frequency bands, is the total received signal power level in that band minus the signal power of the currently used frequency band. These measurements are typically averaged over a period of time to yield an average interference power measurement for each measured channel. Typically, the RF channel with the lowest interference power will be the most preferred channel.

In addition to the IBS measurements of frequency interference, the IMS also performs such measurements. Periodically, the IMS will download its list of available, or preferred, frequencies or channels to the IBS such that the frequency selection within the IBS does not result in selection of a frequency which is unacceptable to the IMS. This is intended to minimize the need for repeated modification of the frequency selection, as well as improve the dynamic frequency selection response within the indoor system. Once the frequency or channel has been selected by the IBS, the IBS transmits the channel selection information to the IMS, as shown in step 1206.

When in an idle mode, such as when there is no call being transmitted between the IBS and the IMS, the IBS will continue to monitor and measure the interference and use levels on all RF channels periodically, as shown by line 1208 which re-starts the monitoring process. During the same idle period, the IMS will only perform measurements immediately following a page signal from the IBS.

In the event there is an increase in the noise or interference level on a frequency which is in use by the indoor system, the IBS selects another frequency and transmits the identity of the new frequency to the IMS to initiate a hand-off, or frequency selection change. Such an interference increase would typically occur in an environment where an OMS approaches an IMS or IBS while actively communicating with an OBS. In the event the interference level raises while in the idle mode, the IBS will inform the IMS of the new frequency by paging. By dynamically changing the frequency of the indoor system to accommodate increases in the interference level of the outdoor system, any interference within the outdoor system by the indoor system is minimized.

In order to minimize the effect of the interference between the indoor communication system and the outdoor communication system, they may be synchronized by methods such as chip level synchronization. Generally, to synchronize signals at the chip level means that the clock period of the PseudoNoise (PN) sequence generator within a transmitted signal is synchronized to a period of the "chip," or to the signal corresponding to an individual term of the PN sequence. In addition to the chip level synchronization, it would also be possible to synchronize the changing of the spreading codes within the IBS to maintain orthogonality between the indoor and outdoor systems. Such chip level synchronization would be appropriate in a CDMA system.

In addition to mainlining synchronization between an outdoor and an indoor communication system, it is also possible to maintain orthogonality between the spreading codes used in the indoor and outdoor systems. In general, and as discussed above, the indoor system operates in the same frequency band as the outdoor system. Because of the higher power levels used in the OMS and OBS, the indoor system communication may be disrupted. One method of minimizing such disruption is to synchronize the signals at the chip level within the two systems.

The outdoor DS-CDMA outdoor communications system may be based on either the IS-95 standard or the J-STD-008, both of which are capable of employing a number of carrier frequencies at each base station, with one frequency used for a forward link, and a second frequency used from a reverse link. Generally, the forward link frequency and the reverse link frequency are separated by a duplex, or guard, band. In this particular exemplary embodiment, the indoor communication system utilizes a DS-CDMA architecture in accordance with the IS-95 standard, and having a similar spreading bandwidth of 1.23 MHZ. However, since the indoor system uses a TDD format on a single frequency within either the uplink or downlink bands, it effectively increases the number of available channels for the indoor system. One channel may be communicating (both transmitting and receiving) within the uplink band, and another simultaneously communicating in the downlink band.

In most indoor systems, the outdoor system forward link frequency band is selected because of the minimal interference coming from the OBS, and because the interference which is received is typically uniform and predictable in nature. In an effort to overcome the noise and interference generated by the OBS, chip level synchronization of the indoor system to the outdoor system was described. However, in a typical indoor environment where there are numerous IMSs and perhaps a few IBSs, it is difficult to select a synchronization which would in fact be synchronous for both the IMSs and IBSs. As a result, it is advantageous to independently synchronize both the IMS and IBS to the interference generating OBS (or OMS, if appropriate).

Figure 6:
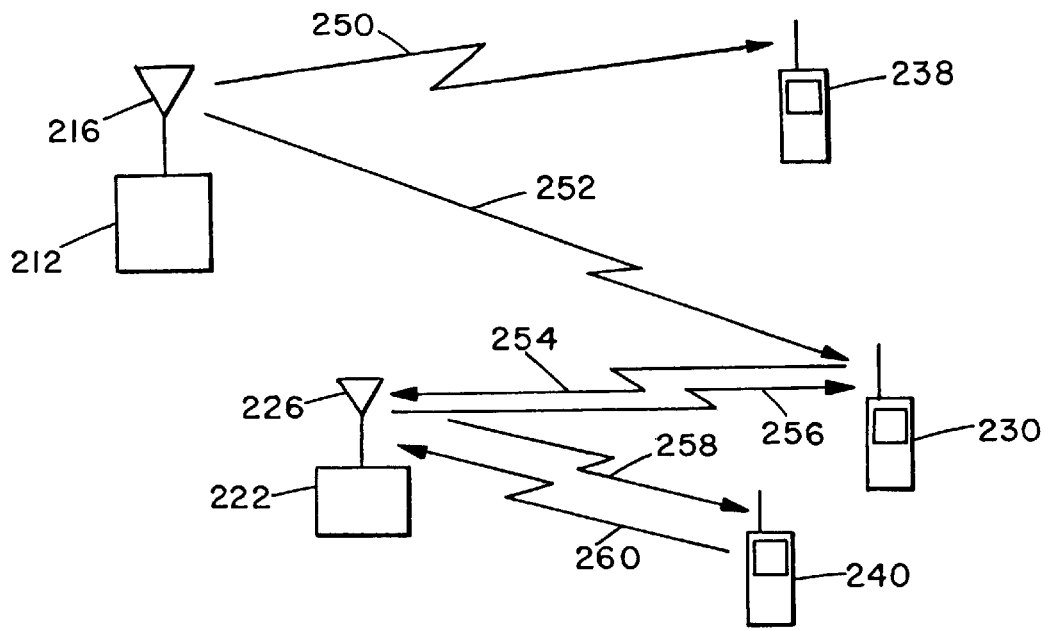
FIG. 6 is a diagram of the interference between an indoor communication system and an outdoor communication system.

Referring now to FIG. 6, a typical diagram of the interference between an indoor communication system and an outdoor communication system of an overlaid system is shown. OBS 212 with antenna 216 are shown transmitting via signal 250 to OMS 238. Similarly, IBS 222 with antenna 226 are shown transmitting and receiving signals 256 and 254 from IMS 230. Also, IBS 222 is transmitting and receiving signals 258 and 260 from IMS 240. As shown in FIG. 6, the transmitted signal 252 from OBS 212 would reach IMS 230 at a different instant than it would reach IMS 240. Similarly, any signal from OBS 212 would reach IBS 222 at a different time than it would reach IMSs 230 and 240. Consequently, any synchronization which was attempted at the IBS would be inapplicable to the IMSs, resulting in a synchronization which was not at the chip level. Because of the un-synchronized nature of the signals received at the IMS, the signals can not be orthogonal as asynchronous Walsh codes are not orthogonal. As a result of this non-synchronized interference source, the communication channel may be disrupted or degraded. Such degradation generally occurs more in the downlink within the indoor system than in the uplink, as power control or multi-user detection can be applied.

In an effort to minimize the effect of positioning and multipath components on the synchronization of an indoor communication system, the IMS measures the relationship between the OBS and the IBS and sends the measurement information to the IBS, which in turn corrects the timing to achieve the desired phase relationship. Such a synchronization scheme facilitates synchronization of both the IMSs and the IBS to the OBS signal. For example, IMS 230 would be independently synchronized to the OBS such that the signal 252 sent from OBS 212 would be synchronized with the incoming signal 256 from IBS 222. Because it is not possible for an IBS or IMS to modify the timing of the signals from the OBS, all synchronization modifications are completed between the IMS and IBS. For example, in order for signal 256 to reach IMS 230 at precisely the same synchronized phase as the signal 252 from OBS 212, the signal 256 must be sent from IBS 222 at the appropriate time. Determination of the appropriate time for sending such signal 256 is made within the IMS 230—when IMS 230 receives both the 252 signal and the 256 signal, a correlation is performed to determine the relative phase relationships and error in synchronization timing between the two signals.

Once the error and phase relationship is determined by the IMS, a signal 254 is transmitted, or uplinked, to the IBS 222. Upon receiving such phase and synchronization timing information, the timing control internal to the IBS 222 is adjusted to either transmit the signal 256 slightly earlier or later than previously sent in relationship to the signal received by IBS 222 from OBS 212. Once the IMS receives the next message from the IBS, the phase and timing relationships are again analyzed to determine if the proper phase synchronization has been reached. If such synchronization has not been reached, the transmit timing of the IBS is again adjusted.

This manner of timing adjustment will successively approach the ideal timing and synchronization for each element of the indoor system. The synchronization of each of the IMSs 230, 240, and any others present may be fine tuned to eliminate the interference of the OBS 212 on the indoor communication system.

Figure 16:
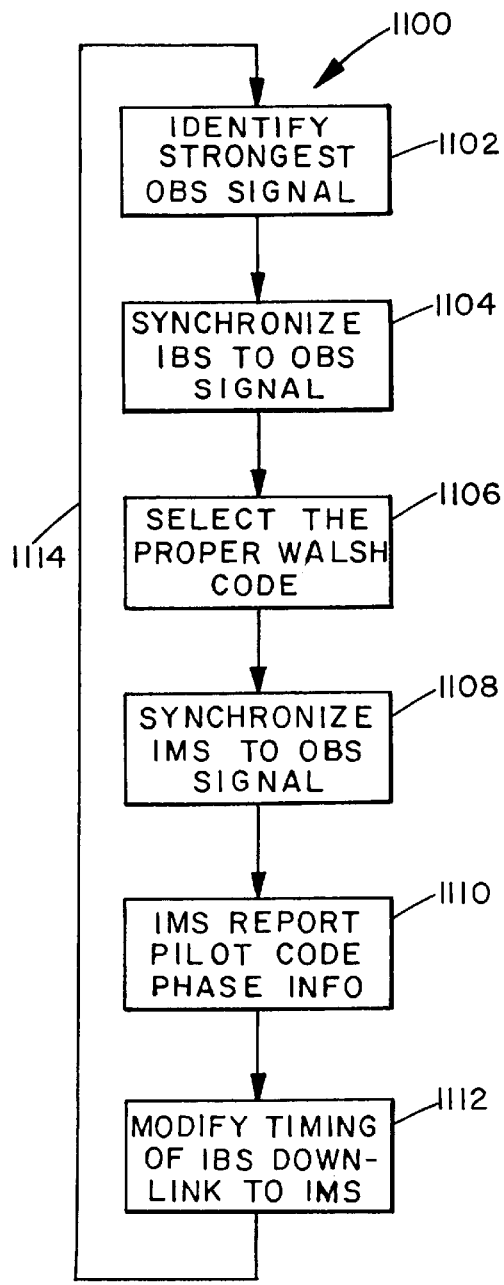
FIG. 16 is a flow chart detailing a method of implementing the IMS synchronization.

Implementation of an individual synchronization scheme can be accomplished by attempting to synchronize with the strongest OBS signal, such as the pilot code. Referring ahead to FIG. 16, a flow chart detailing a method of implementing the IMS synchronization is shown and generally designated 1100. Flow chart 1100 begins with the identification of the strongest OBS signal in step 1102. Once the strongest signal is identified, the IBS is synchronized in step 1104 to the signal from the strongest source, and one or more of the WHT codes is selected in step 1106 as an orthogonal code for use within the indoor system. In step 1108 the IMS also synchronizes to the OBS signal, and in step 1110 reports its pilot code phase information to the IBS. Once the phase information is received from the IMS, the IBS modifies the timing of its downlink transmissions in step 1112 to the IMS such that the transmitted signal will reach the IMS at the same time as the signal from the OBS, thus maintaining synchronization. This process may be repeated as shown by line 1114 in order to successively approximate perfect synchronization, and to accommodate any change in signal pathways, such as disturbances within the indoor or outdoor communication systems.

If synchronization fails and the IMS is not in sync with both the IBS and the OBS, the IMS will be unable to establish communication with the IBS. This is likely so because of the elevated interference level on the RF channel. Detection of such a lack of synchronization is achieved by a periodic paging of the IMS by the IBS. In operation, once the IMS receives a page signal from the IBS, it is to respond indicating that the communication channel is open. However, in the event that no page is returned by the IMS, the IBS assumes that there is a synchronization problem, and should select an alternative RF channel, then page again.

In the event synchronization is too difficult to maintain due to multipath or other disturbances, multiuser detection schemes, as well as interference cancellation techniques may be implemented within the indoor system. Such schemes and techniques are well known in the art and may be readily incorporated into the system because the channel changes within the indoor system are relatively slow allowing adaptive methods sufficient time to converge. Moreover, because the adaptive methods do not require the knowledge of interfering codes, it is feasible for implementation is a system where synchronization is not possible.

In another alternative embodiment of the present invention, the phase control between the OBS and the IMS is addressed by providing an orthogonal signal to the IMS. This orthogonality may be achieved in the frequency domain or in the phase domain. Phase control is especially well suited for reducing the interference from the interfering OBS to the IMSs or IBS. This is so because the IMS moves relatively slowly within the coverage area of IBS 222, resulting in slow-changing phase shifts in the indoor communication channel.

Figure 18:
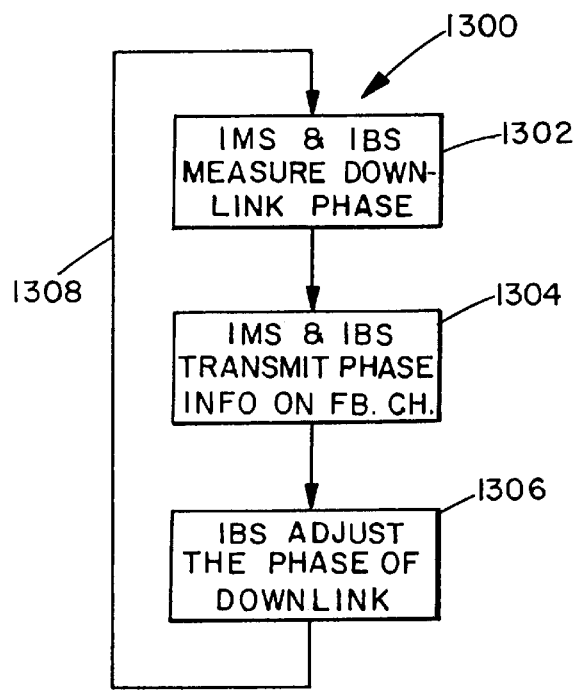
FIG. 18 is a flow chart which details the operation and phase control in a typical indoor system.

Referring to FIG. 18, a flow chart 1300 details the operation and phase control in a typical indoor system. First step 1302 indicates that the receivers for both the IBS and IMS measure the phase of the downlink transmission from the strongest interfering base station, such as by measuring the signal strength of the pilot channel or decision feedback channel from the OBS. Given that the estimated phase of the carrier frequency signal from the OBS is ($\theta_1$), the desired phase of the carrier frequency signal from the IBS, when received at the IMS, is ($\theta_1-90°$). In step 1304, the IBS and IMS transmit a phase control command in the feedback channel. This command typically would include the phase error, or absolute phase or differential phase change from the previous phase measurement value. Next, the IBS and IMS adjust the phase of the transmissions in the direction indicated by the phase error (step 1306). This process is repeated as shown by connecting line 1308, to accommodate any changes in the phase relationships between the OBS and the IMS. Once the phase error signal is reduced to zero, the phase of the incoming carrier signal from the OBS is exactly 90 degrees from the phase of the incoming carrier signal from the IBS. As a result, the indoor system and the outdoor system are orthogonal to each other in phase since the difference in the carrier frequency signal phase is 90 degrees. In order to establish a 90 degree phase relationship between the indoor system and an interfering outdoor system, the communication system must use a binary phase shift key (BPSK) format. This 90 degree orthogonality is not achievable using a QPSK signal due to the presence of both sine and cosine carrier frequencies.

Referring briefly to FIG. 6, a configuration which would benefit from carrier phase synchronization is shown. For example, when an IBS 222 and IMS 230 are within the coverage area of OBS 212, the IBS will receive signals 252 and 256 from the OBS 212 and IBS 222, respectively. In this configuration, minimization of interference from the OBS 212 may be accomplished by adjusting the carrier frequency phase of the BPSK signal 256 to ensure that it is 90 degrees out of phase, or orthogonal, from the carrier frequency phase of signal 252.

In operation, IMS 230 would receive signals 252 and 256 from the OBS and IBS, and determine the phase relationship between them. Following determination of the phase error, the IBS adjusts the phase of transmission signal 256 in the direction suggested by the error, and an new message 256 is transmitted. This new message is also analyzed by the IMS, and yet another phase error is determined. By repeatedly adjusting the carrier frequency phase of the signal 256 from the IBS 222, the 90 degree phase relationship may be established and maintained.

Figure 7:
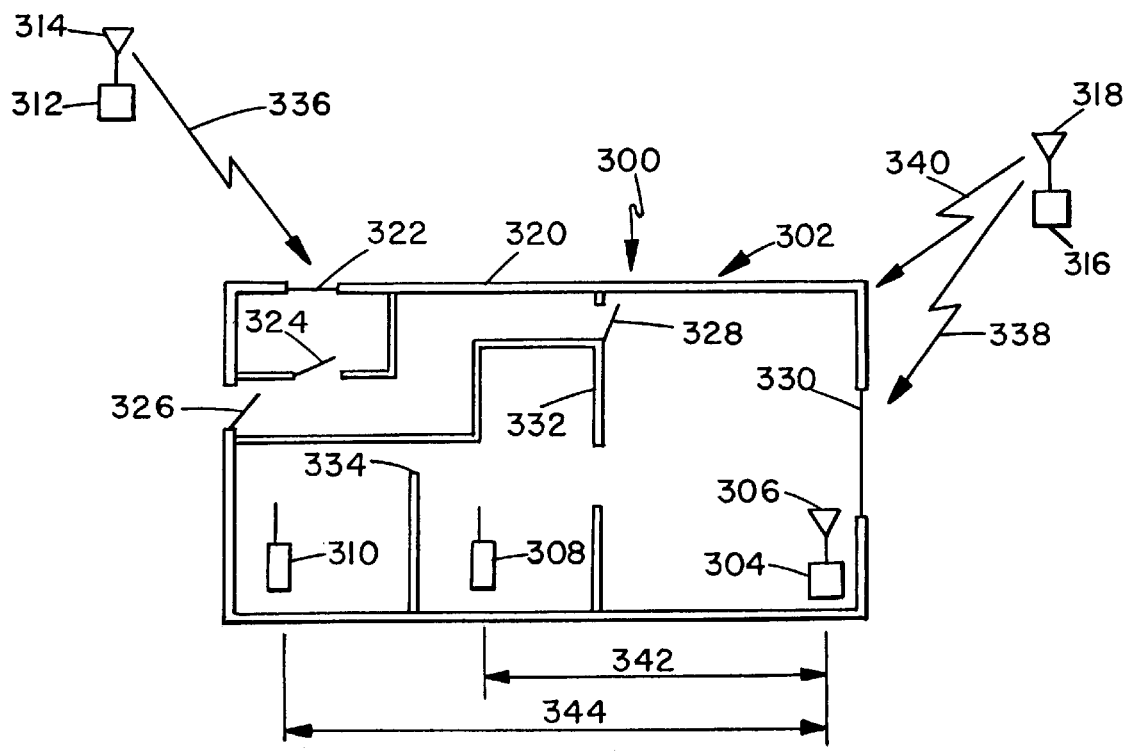
FIG. 7 is a diagram of a top view of a building showing the various sources of interference and multipath, as well as interference from two different outdoor base stations.

Referring now to FIG. 7, a diagram of a top view of a building showing the various exemplary sources of interference and multipath, as well as interference from two different outdoor base stations, is shown and generally designated 300. Building 302 includes an IBS 304 with an antenna 306 which communicates with a pair of IMSs 308 and 310. OBS 312 with antenna 314 and OBS 316 with antenna 318 are located outside building 302, however, building 302, and the IMSs and IBS are within the coverage area of at least one OBS 312 or 316. The synchronization techniques discussed above are particularly important in an indoor environment because of the dynamic characteristics of the environment, as well as the lower power level typical in an indoor system. These dynamic characteristics are influenced by the materials within walls 320, the presence of windows 322 and 330, internal doors 324 and 328, external doors 326, and partitions 332 and 334, since opening and closing of windows and doors within a building can drastically change the multipath signals provided to IMSs 308 and 310. As a result, the dynamic channel selection and synchronization techniques disclosed above are useful in an indoor system in order to provide the most reliable communication channel possible.

Because the distance 342 between the IBS 304 and IMS 308 is different than the distance 344 between IBS 304 and IMS 310, it is necessary to synchronize the two IMSs 308 and 310 separately. Moreover, because the IMSs 308 and 310 are separated from OBS 312 by differing distances, the signals 336 from OBS 312 will reach the IMSs at different times. By implementing the channel selection and chip level synchronization techniques discussed above, the overlaid system 300 will function properly.

The operation of system 300 would include the step of IBS 304 monitoring a frequency band utilized by either or both OBSs 312 and 316 to determine a frequency which is experiencing little interference, or is substantially unused. Such frequency band could be in either the uplink or downlink frequency band. Once a RF frequency is selected by the IBS 304, a pilot signal is sent from antenna 306 and received by IMSs 308 and 310. In an area where there is sufficient interference from the OBSs 312 or 316, it is necessary for the IBS 304 to identify the strongest OBS signal for synchronization purposes. Once the IBS is synchronized with the strongest source, the IMSs respond to the pilot signal with their appropriate phase information. Using such phase information, the IBS 304 modifies the timing of transmissions from the antenna 306 such that the transmission reach the IMSs in phase with the signal from the strongest OBS. The variations in building 302, i.e., changes in the multipath, will require continuous or near-continuous synchronization within the indoor system. For example, if signal path 338 is obstructed, and signal path 340 suddenly becomes the stronger signal, the IBS and IMSs will synchronize to the new signal 340, which likely has a different signal path length, requiring a different synchronization delay.

In an indoor system where there are two OBSs 312 and 316 which are relatively close, it is possible that the IMSs and IBS will not only need to change synchronization phasing, but will also need to re-evaluate the frequency band selection. This could perhaps result in moving from the forward link frequency band of OBS 316 to the reverse link frequency band of the OBS 312.

In addition to the use of synchronization techniques, the spreading codes in a CDMA indoor system could be selected as discussed above to be orthogonal to those in use by either OBSs 312 or 316. Thus, by combining the synchronization of communication between the IBS, IMS and OBS with an orthogonal code selection in a CDMA system, a reliable and interference-free communication channel may be achieved within an indoor system.

Figure 8:
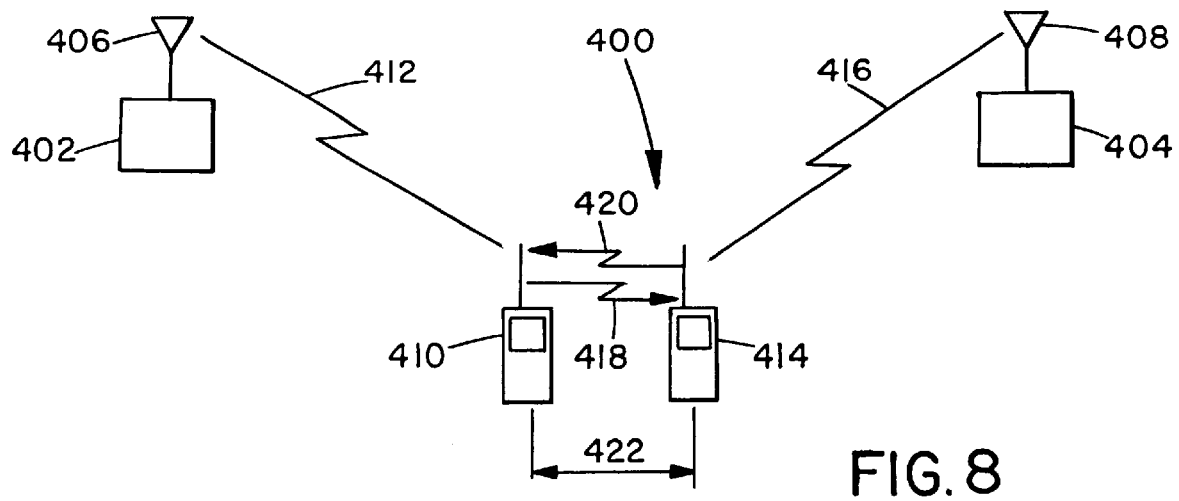
FIG. 8 is a diagram showing the interference of neighboring indoor communication systems.

An alternative embodiment of the present invention is demonstrated by system 400 shown in FIG. 8. System 400 includes a first IBS 402 and a second IBS 404 having antennas 406 and 408 respectively. IMS 410 communicates with IBS 402 via signal 412, and IMS 414 communicates with IBS 404 via signal 416. Due to the short distance 422 between IMSs 410 and 414, the transmit signal 418 from IMS 410 is received by IMS 414, and the transmit signal 420 from IMS 414 is received by IMS 410. Depending upon the mode of each IMS, severe interference and near-far effects can be inflicted upon the IMSs. This problem is particularly destructive in asynchronous TDD systems which result in variable interference patterns caused by the random sliding of an interfering frame over a user's frame. This interference effectively masks the given band for both the interfering system and the user's system. As a result of the difficulty in utilizing two or more indoor systems within a common area, it is advantageous to synchronize the interfering system to the user's system to eliminate any sliding interference pattern.

Figure 9:
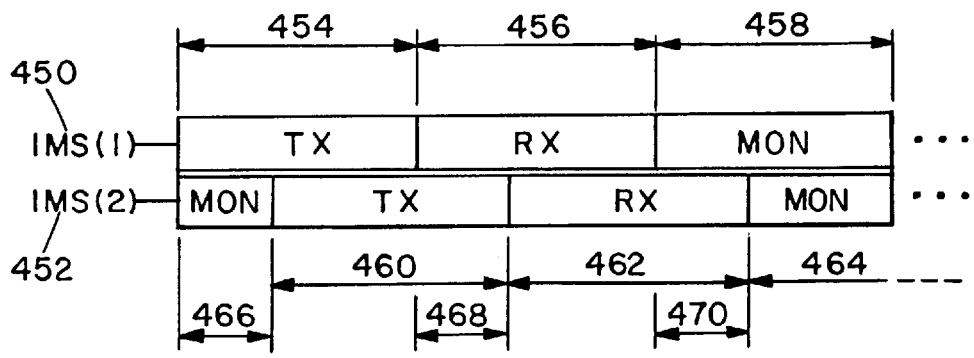
FIG. 9 illustrates the communication pattern of the two indoor communication systems shown in FIG. 8 which are unsynchronized with respect to each other, and detailing areas of extreme near-far effect.

Referring now to FIG. 9, a communication pattern is shown for two un-synchronized indoor communication systems. Frame 450 is representative of the operation of IMS 410, and frame 452 is representative of the operation of IMS 414. Referring back to FIG. 2, it is to be appreciated that frames 450 and 452 are portions of a TDD communication system which is utilized within either the uplink or downlink frequency band in a typical outdoor communication system. Frame 450 has transmit time slot 454, receive time slot 456, and monitor time slot 458. Similarly, frame 452 has a transmit time slot 460, a receive time slot 462, and a monitor time slot 464. However, because the communication channels of IBS 410 and IBS 414 are not synchronized, there exists periods of interference 466, 468, and 470. Interference periods between a transmit frame and a receive frame, such as interference period 468, present a problem, causing a substantial near-far condition because, during interference period 468, IMS 410 is attempting to receive a signal from IBS 402, and at the same time, IMS 414 is attempting to transmit to IBS 404. This results in saturation of the input to IMS 410, causing channel rejection and effectively destroying any communication with IBS 402. Additionally, interference period 466 will prevent IMS from adequately monitoring the frequency bands.

Figure 10:
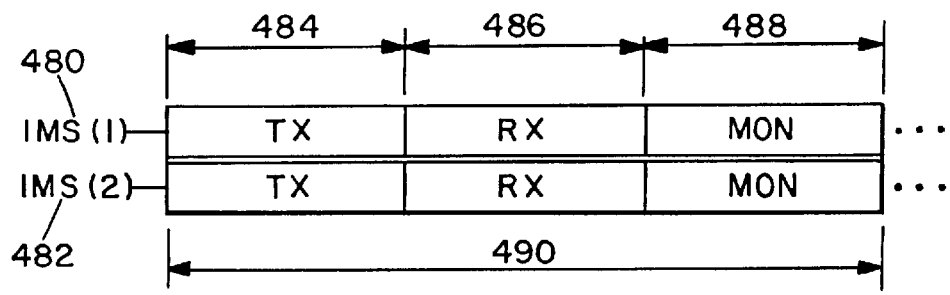
FIG. 10 illustrates the communication pattern of the two indoor communication systems shown in FIG. 8 which are synchronized with respect to each other, thereby eliminating any extreme near-far effect.

Referring to FIG. 10, a typical synchronized communication pattern for the two indoor communications is shown. Frame 480 is synchronized to frame 482 such that both IMSs 410 and 414 are transmitting in time slot 484, receiving in time slot 486, and monitoring in time slot 488. As a result, frame 490 represents a combined frame having both communication channels, having no interference periods which will cause a near-far effect.

The synchronization shown in FIG. 10 is typically accomplished by each IMS monitoring the carrier frequency within each 1.25 MHZ channel. The band is monitored at intervals having a maximum of two frame lengths, equating to approximately 20 milliseconds. During this monitoring period, each monitoring IBS adjusts its internal timing such that it is synchronized with the channel being monitored. This type of timing adjustment is known as "sliding mask monitoring." At the end of the monitor period, frame level synchronization is achieved, resulting in all IMSs transmitting, receiving, and monitoring the channel for interference simultaneously.

The sliding mask monitoring is performed for each 10 millisecond interval, corresponding to the burst length, so that the measurements are done on the wideband carrier as well as on the narrow-band despread signal. Using the despread signal naturally assumes that the monitoring system knows the pilot sequence, or codes, of the system it is trying to synchronize to. It is advantageous to use both techniques because wideband measurements give rough synchronization, and the pilot signal may then be used to synchronize down to the chip interval. In a preferred embodiment, the pilot signal has the same period as the frame length, or the frame synchronization is based on another known sequence at the bit level.

In addition the synchronization to assist in the avoidance of any near-far problems, it is also advantageous to provide a short guard time slot between the time slots 484, 486, and 488, to ensure there is no interference between the two systems. Such a guard time slot can be substantially shorter than the functional time slots, effectively protecting against interference, while maintaining a high degree of efficiency within the frame.

Figure 11:
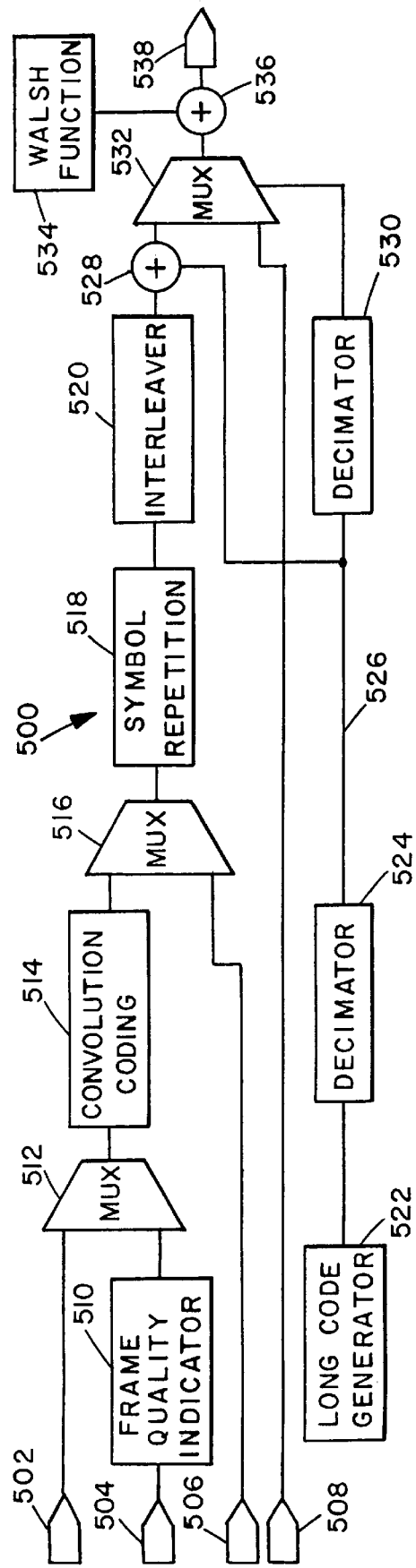
FIG. 11 is a block diagram of an input channel for a transmission chain for indoor reverse and forward links for a high data rate transmission.
Figure 12:
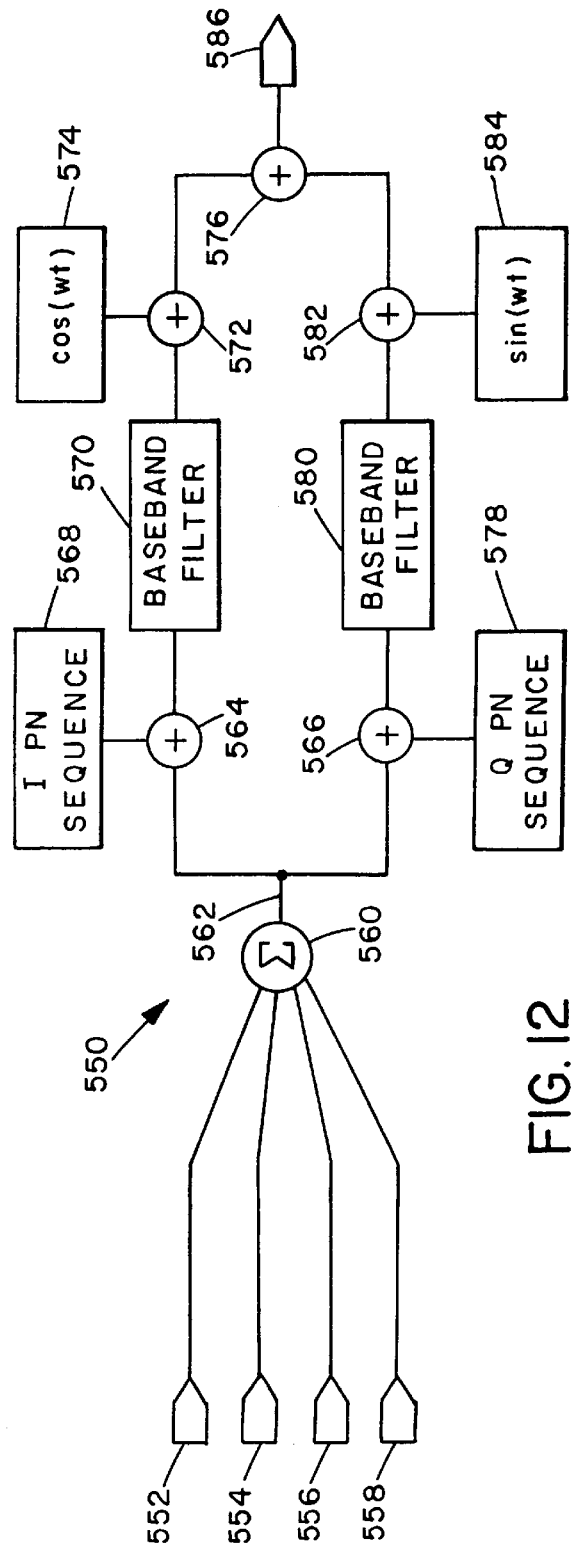
FIG. 12 is a block diagram of a summing QPSK system which receives up to four channels shown in FIG. 11.

Referring now to FIG. 11, a block diagram of an input channel for a transmission chain for indoor reverse and forward links for a high data rate transmission is shown and generally designated 500. FIG. 12 shows a block diagram of a summing QPSK system which receives up to four of the input channels shown in FIG. 11, and is generally designated 550. In FIG. 11, input 502 receives 8 tail bits which are combined with FER 1E2 services on input 504 which are processed through a frame quality indicator 510. The output of indicator 510 is combined in multiplexer 512 and convolutionally coded by coding device 514 having r=½, and K=9. The output of the coder 514 is fed into multiplexer 516 where it is combined with input 506 which receives un-coded services. The output from multiplexer 516 is passed through symbol repetition block 518 to interleaver 520. The output from interleaver 520 is combined in adder 528 with the product of long code generator 522 and decimator 524 on output 526. Additionally, the product from decimator 524 on output 526 is also provided to an another decimator 530. Output from the decimator 530 controls the multiplexer 532 which receives the output from the adder 528 and PC symbols on input 508. Walsh function generator 534 provides a spreading code to adder 536 which also receives the output from the multiplexer 532, and is provided to output 538.

Referring to FIG. 12, the inputs 552, 554, 556, and 558 are intended to receive an output 538 from input channel 500. The inputs are fed to a summation device 560 and the output 562 is split into two channels, an I channel, and a Q channel. These channels correspond to a QPSK modulation device which receives an input 562, and adds a I series PN sequence 568 to one leg, and a Q series PN sequence 566 to another leg. Once summed in adders 564 and 566, the outputs are filtered by baseband filters 570 and 580 and provided by multipliers 572 and 582. Multiplier 572 modulates the I series channel with cos(ωt) 574, and multiplier 582 modulates the Q series channel with sin(ωt) 584. The output of the modulators are fed to adder 576 where the modulated signals are combined and delivered out output 586.

Figure 13:
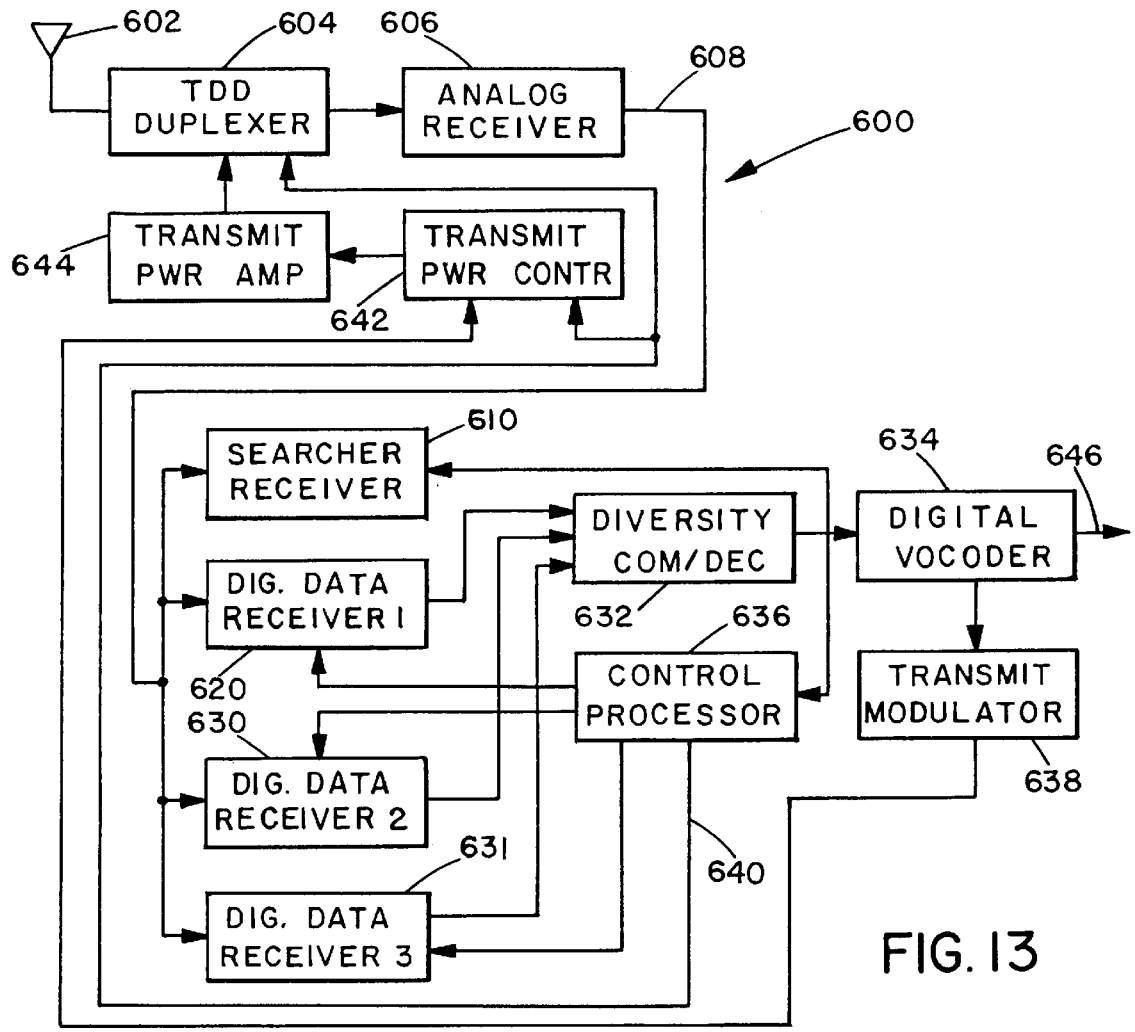
FIG. 13 is a block diagram of portions of a CDMA transceiver which may be used in an indoor mobile station or indoor base station.

Referring now to FIG. 13, a block diagram showing portions of a CDMA transceiver is shown and generally designated 600. Transceiver 600 is of a type typically used in an IMS and IBS of the present invention. Transceiver 600 includes an antenna 602, a TDD duplexer 604, analog receiver 606, transmit power controller 642, and transmit power amplifier 644. Output 608 from the analog receiver 606 is split and provided to searcher/receiver 610, and three of digital data receivers, commonly called "rake" receivers, 620, 630, and 631. A diversity combiner/decoder 632, a control processor 636, a digital vocoder 634, and a transmit modulator 638 are fed with the outputs from the searcher/receiver 610 and rake receivers 620, 630 and 631.

Antenna 602 is coupled to analog receiver 606 through TDD duplexer 604. Signals received on antenna 602 are input to analog receiver 606 through TDD duplexer 604. TDD duplexer 604 receives control signals from control processor 636 and function to couple analog receiver 606 to antenna 602 during the receive slot of the device in the transceiver 600 is used. TDD duplexer 604 also serves under the control of control processor 636 to couple transmit power amplifier 644 to antenna 602 during the transmit slot and, couple antenna 602 to analog receiver 606 during the monitor slot of the device in which transceiver 600 is used.

Signals received during the receive slot are converted into an IF frequency and then filtered and digitized in analog receiver 606 for input to rake receivers 620, 630 and 631, and searcher/receiver 610. The digitized IF signal input to rake receivers 620, 630 and 631, and searcher/receiver 610 may include signals from many ongoing calls plus the pilot carriers transmitted by the base station in all neighboring cell sites. The digitized IF signal is processed in the rake receivers 620, 630 and 631 and searcher/receiver 610 according to control signals generated in control processor 636. Since transceiver 600 operates in both the uplink and downlink, control processor 636 provides control of the transmit power amplifier 644 and analog receiver 606, and the TDD duplexer 604 in order to efficiently communicate via antenna 602.

Rake receivers 620, 630 and 631 perform correlation on the IF signal with the PN sequence of a desired received signal. If transceiver 600 is operating in the downlink band of the outdoor system, the PN sequence is the Walsh code used by the transmitting device at the other end of the link. If the transceiver 600 is operating in the uplink band of the outdoor system, the PN sequence is the PN sequence that is assigned to the indoor system. The output of rake receivers 620, 630 and 631 is a sequence of encoded data signals from two independent paths. Searcher/receiver 610 scans the time domain around the nominal time of a receive pilot signal of a base station for other multi-path pilot signals from the same base station and for other signals transmitted from different base stations. Searcher/receiver 610 measures the strength of any desired wave form at times other than the nominal time. Searcher/receiver generates signals for control processor 636 which indicates the strengths of the measured signals.

The encoded data signals output from the rake receivers 620, 630 and 631 are input to diversity combiner/decoder 632. In diversity combiner/decoder 632, the encoded data signals are aligned and combined and the resultant data signals are then decoded using error correction and input to digital vocoder 634. Digital vocoder 634 then outputs information, such as digitized speech signals, to the user interface (not shown) via output 646. User interface attached to output 646 may be a handset with a keypad, or another type of user interface such as a laptop computer monitor and keyboard, or a microphone or speaker.

For transmission of signals from an IMS, a signal received at the user interface 646 is input to user digital vocoder 634 in digital form, such as data or voice that has been converted to digital form at user interface 646. In digital vocoder 634, the signal is encoded and output to transmit modulator 638. Transmit modulator 638 Walsh encodes the signal and then modulates the Walsh encoded signal onto a PN carrier signal with the PN carrier sequence being the PN carrier sequence of the CDMA channel to which the mobile station is assigned. The PN carrier information is transmitted to IMS from the system IBS and transferred to control processor 636 from rake receivers 620, 630 and 631 after being received from the system. Control processor 636 sends the PN carrier information to transmit modulator 638. The PN modulated signal is then output from transmit modulator 628 to transmit power control 642. Transmit power control 642 sets the level of the transmission power of the mobile station according to commands received from control processor 636. The power control command may be generated by control processor 636 according to command received from the system or may be generated by software of control processor 636, according to predetermined criteria, in response to data received from the system through the rake receivers 620, 630 and 631.

The modulated signal is then output from transmit power control 642 to transmit power amplifier 644 where the signal is amplified and converted to an IF frequency signal. The IF frequency signal is then output from power amplifier 644 to duplexer 604 and transmit from antenna 602.

Figure 21:
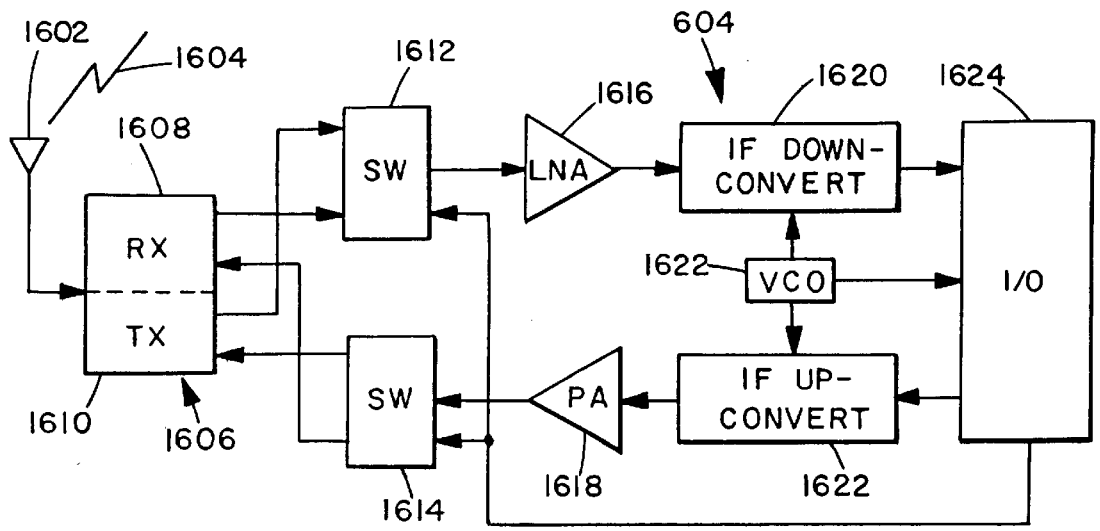
FIG. 21 is a block diagram showing a typical TDD multiplexer which is implemented in both the IMS and IBS of the present invention.

Duplexer 604 is of a type known in the art, and is shown in the block diagram of FIG. 21. Duplexer 604 is attached to antenna 1602 which receives signal 1604 from an IMS or IBS, and the signal is passed through transmitter/receiver 1606. Control of transmitter/receiver 1 606 is achieved by I/O controller 1624 which monitors the frame timing shown in FIGS. 2, 9, and 10 to provide the proper access to the antenna 1602 to either the transmitter portion 1608 or the receiver portion 1610 of transmitter/receiver 1606. Once a signal is received on antenna 1602, switch 1612 is activated to pass the signal to low noise amplifier 1616 and on to intermediate frequency downconverter 1620. The downconverter 1620 is provided with its necessary reference frequency from voltage controlled oscillator 1622, which is also controlled by I/O controller 1624.

In the transmitting configuration, the I/O controller 1624 directs switch 1614 to provide access of the intermediate frequency upconverter to the antenna 1602 through power amplifier 1618 and transmitter/receiver 1606. Thus, by controlling the position of the switches 1612 and 1618, the direction of signal flow is controlled, allowing a duplex usage of a single antenna.

Figure 14:
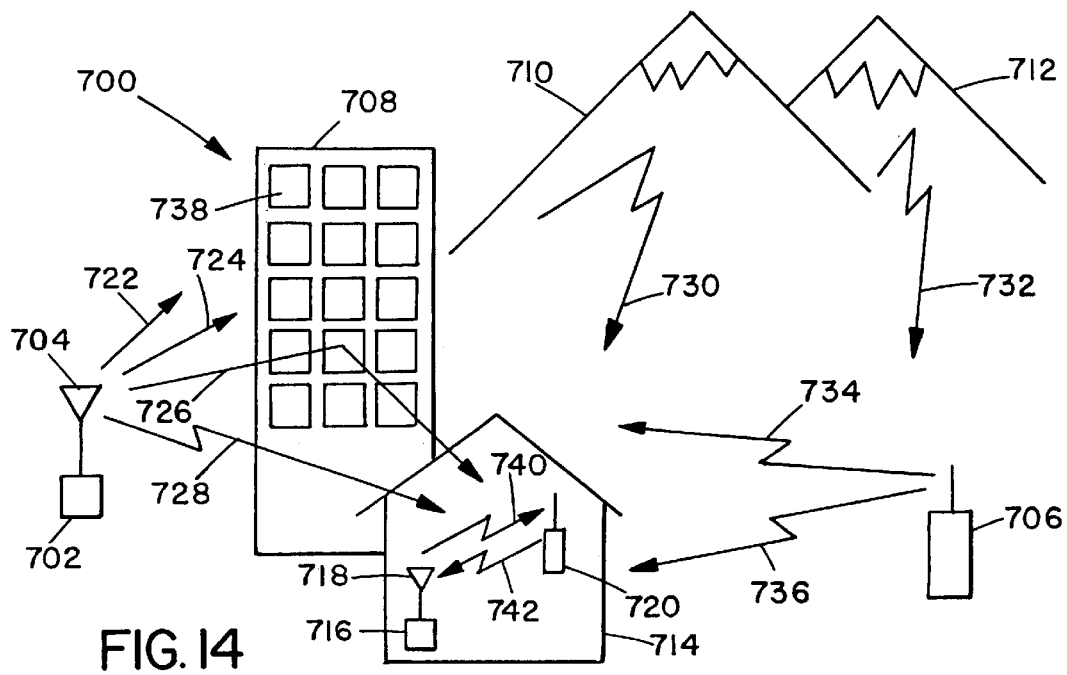
FIG. 14 is a diagram of an indoor communication system within the coverage area of an outdoor communication system, showing the various sources and causes of interference and multipath.

Referring now to FIG. 14, a diagram of an indoor communication system overlaid within the coverage area of an outdoor communication system, including the various sources and causes of interference and multipath is shown and generally designated 700. OBS 702 with antenna 704 is communicating with OMS 706. Obstacles which typically create multipath are building 708, mountains 710 and 712, and house 714. Within the house 714 is an indoor communication system which includes IBS 716 with antenna 718 which is communicating with IMS 720.

OBS 702 transmits signals 722, 724, 726, and 728 which in turn bounce off building 708, as well mountains 710 and 712 to form reflected signals 730 and 732. In addition to the reflected signals, OMS 706 is transmitting signals 734 and 736 which pass through the indoor system within house 714. Signals 726, 728, 730, 732, 734 and 736 are representative of the diversity of signal types which are present in an overlaid communication system. More particularly, each of these signals exhibits a different phase relationship when reaching IMS 720, despite originating from only two sources.

In such a situation, the techniques discussed above would be useful to eliminate any interference in the communication channel between IBS 716 and IMS 720 via signals 740 and 742. For example, it would be advantageous for the indoor communication system to monitor the outdoor communication system to identify any low-interference channels, or channels with low activity within the outdoor system. Additionally, it would be beneficial to dynamically select the interference-free channel to accommodate any changes within the communication link between OMS 706 and OBS 702. Orthogonal spreading codes may be used to minimize the near-far effect of the outdoor communication system. The communication within the indoor communication system should be synchronized to the outdoor communication system, including carrier frequency phase synchronization and intra-system synchronization of other indoor systems (if present) to prevent any near-far problems. One, some, or all aspects of the present invention may be implemented in a single overlaid communication system.

In order to demonstrate the feasibility of the above-described indoor communication system, simulations of the indoor CDMA telecommunications system were run, the results of which are provided in Table 2, showing the picocell capacity in a case of an outdoor network having twenty-five OBSs. For purposes of the simulation, the system was presumed to be a cellular system according to the IS-95 standard. The outdoor load on the system was 244 simultaneous users, which represented approximately 80% of the system capacity, and the initial outage of the outdoor network is 3.1% when no picocells are introduced. More than 64 users can be supported within an multicell indoor system provided the system is code-limited instead of interference-limited. In a typical indoor system (microcellular), such as that detailed in the IS-95 standard, the 64 Walsh codes may be reused in geographically remote locations, provided the separation distance is sufficient to minimize any interference between the indoor systems using the same Walsh code.

TABLE 2

| # OF OUTDOOR MOBILES | # OF INDOOR MOBILES | OUTDOOR OUTAGE | INDOOR OUTAGE |
|---|---|---|---|
| 244 | 200 (100 using uplink, 100 using downlink) | 3.35% | 6.07% |
| 244 | 400 (200 using uplink, 200 using downlink | 3.45% | 6.10% |
| 244 | 600 (300 using uplink, 300 using downlink) | 3.79% | 6.71% |

As can be seen from Table 2, the characteristics of the indoor channel allow the overlay system to provide approximately 250% of the outdoor system capacity.

The simulation provides means for determining the potential interference between the outdoor and indoor telecommunications networks when both systems occupy the same frequency band and environment. The simulation scenario consists of an outdoor telecommunications network overlaid on an indoor telecommunications network, where both networks use some form of the IS-95 CDMA standard, and where the networks have the following characteristics and conditions: The outdoor network is assumed to use the standard IS-95 air interface. The coordinates of the OBS are fixed, and the OMS are distributed randomly throughout the network. The outdoor network represented includes twenty-five outdoor cells where the corresponding base stations are separated by 1.43 km, and the speed of the OMSs varies between 0 and 30 km/H. The OBS antenna gain is assumed to be 16.0 dB, with each OBS having two such antennae, and the OMS antenna gain is assumed to be −3 dB. It is assumed that there are two Rayleigh faded multipaths of equal strength for each antenna. The interference protection margin is 10.0 dB for the reverse link, and 3.0 dB for the forward link. The service quality threshold is 7.0 dB with one antenna for both the forward and reverse links, and the PC threshold is 10.5 dB in the reverse link, and 12 dB for the forward link. The simulation assumes that the voice is on at all times, despite the reality that voice is on only 40% of the time. The result of such an assumption is that the simulated macrocell capacity will drop to about one-half of the true capacity.

The outdoor cell dimensioning is optimized for 9.6 kbps connections, and planned for a dense urban and low antenna environment. The following propagation model was used in the simulation, which was derived from the COST 231-Walfish-lkegame model:

$$L(dB)=145.3+38.0*log(d)$$

where 145.3 is the path loss at the reference distance d which is measured in km.

As implemented in the simulation, the indoor telecommunications network consists of one IBS and one IMS, which are assumed to operate within the same carrier frequency band as the overlaid outdoor telecommunications system. Any number of indoor systems may be located within an outdoor system, with no hand-off capability between the indoor systems, or between the indoor system and the outdoor systems. An IMS is always connected to an IBS, and an OMS is always connected to an OBS. The IMSs are assumed to be slow moving with speeds of 1.5 km/H, and there is only one antenna with each IMS and IBS. The IBS antenna has no gain, and the IMS has a loss of −3 dB. The radius of coverage for the indoor system is estimated to be 120 m having a peak power of 10 mW, and the service requirements 9.0 dB for the indoor system operating in the outdoor reverse link, and 5.0 dB for the indoor system operating in the outdoor forward link. The interference protection margin is 3.0 dB for the indoor system in both the reverse and forward links.

The propagation model used in the simulation of the indoor system assumes that there is a single path between the IMS and the IBS. The maximum power and distance between the OBS and the OMS is defined by the IS-95 link budget, and cannot be less than 100 m. Similarly, the minimum distance between the IMS and the IBS should not be less than about 10 m. The propagation model which was used in the simulation of the indoor system is as follows:

$$L=L_0+n*log(d)$$

where $L_0$ is the path loss at the reference distance d, which in free space is calculated to be 37 dB, and where in an indoor environment, n can have values ranging from 12 corresponding to an open corridor, up to 65 corresponding to a metal partitioning. In the simulation, n is randomly varied between 12 to 40.

Figure 24:
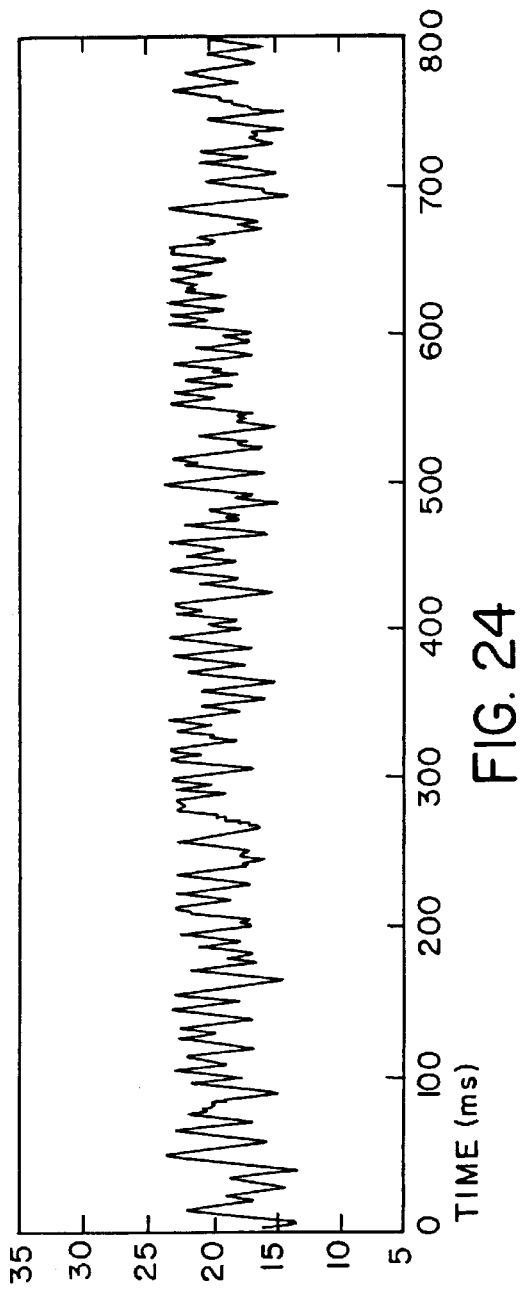
FIG. 24 is a plot of the variation in transmission power with time for a representative OMS.

The simulation observed the operation of the network for a period of 1735 ms, with the first 125 ms representing the outdoor stabilization time required for the stabilization of transmit powers within the OBS and various OMSs. Only after the outdoor system has stabilized is the indoor system introduced into the system. FIG. 24 is a plot of the variation in transmission power for a representative OMS, which shows the variation in power which is assumed to be based on the $E_b/(I_0+N_0)$ model, where $E_b$ is the power ratio of the desired signal to that of the interference and $I_0$ is the level of interference. $N_0$ is the additive white Gaussian noise which corresponds to where $N_0$ is the power spectral density of the channel-additive white Gaussian noise. This power equation is applicable because, traditionally, both the interference and Gaussian white noise are Gaussian noise-like in nature.

Figure 25:
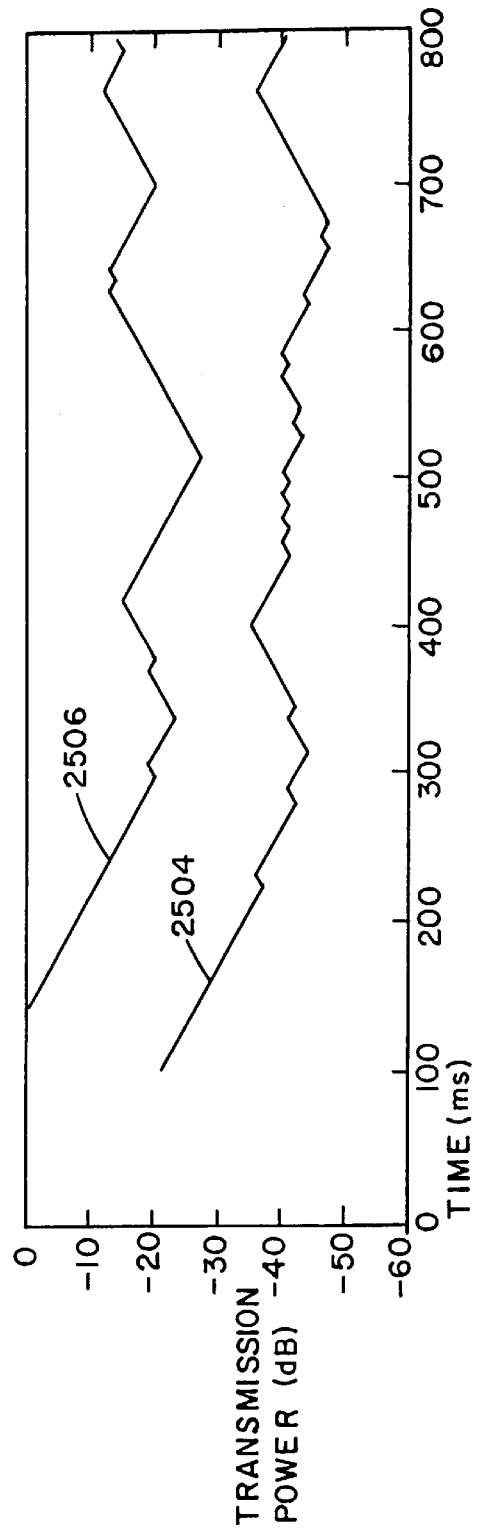
FIG. 25 is a plot of the indoor and outdoor transmit powers with time.

In the simulation scenario, the power is changed every 1.25 ms, with a delay of 2.5 ms and a correction step of 1 dB. FIG. 25 is a plot of the indoor and outdoor transmit powers, where line 2502 corresponds to the outdoor power levels, and line 2504 corresponds to the indoor power levels. As shown, within 375 ms, both the indoor and outdoor system power levels have been stabilized. The above power control scheme is applied to all OMSs for at least 100 iterations before entering the observation period of 0.5 s as shown in FIG. 25.

In the simulation, the TDD communication format in the indoor system requires the IBS and the IMS to transmit signals at alternate intervals. The time slot interval for both the transmission time slot and the receive time slot is 8.75 ms, and the monitoring time slot interval is 2.5 ms, for a total frame time of 20 ms.

The simulation of the TDD transmission within the outdoor forward link band indicates that the interference to the indoor system comes mainly from the nearby OBSs. To combat this interference, it is assumed that the IMS and IBS are synchronized to the OBS such that such interference is minimized. The TDD transmission within the outdoor reverse link band, any nearby OMSs act as an interference source, which are assumed to have two Rayleigh faded paths to the indoor system. In the simulation of the uplink and downlink TDD communication, the DCA thresholds are set at 9 and 15 dB.

The results of the simulation are shown above in Table 2, and indicate that performance of the TDD system in the reverse link band is better than the performance of the TDD system in the forward link band. This occurs due to the random positioning of the OBSs with respect to the IMS location. However, despite the more problematic interference generated by randomly positioned OBSs, the indoor CDMA telecommunications system nevertheless minimized the apparent interference using the methods discussed above, resulting in the maximization of whole network capacity.

Figure 15A:
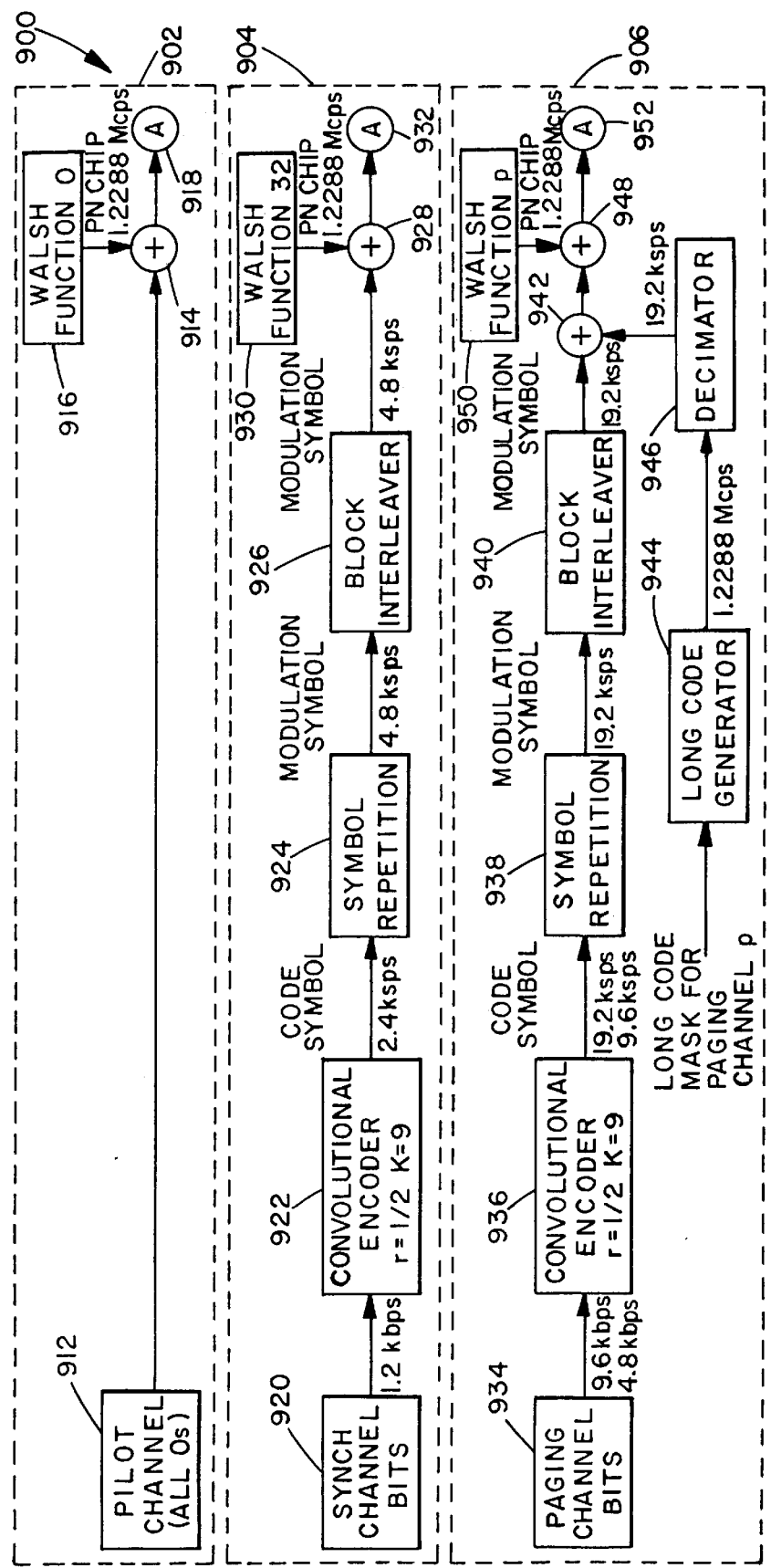
FIG. 15 is a block diagram of a indoor base station transmitter showing some of the modifications necessary to implement a chip level synchronization with another communication system.
Figure 15B:
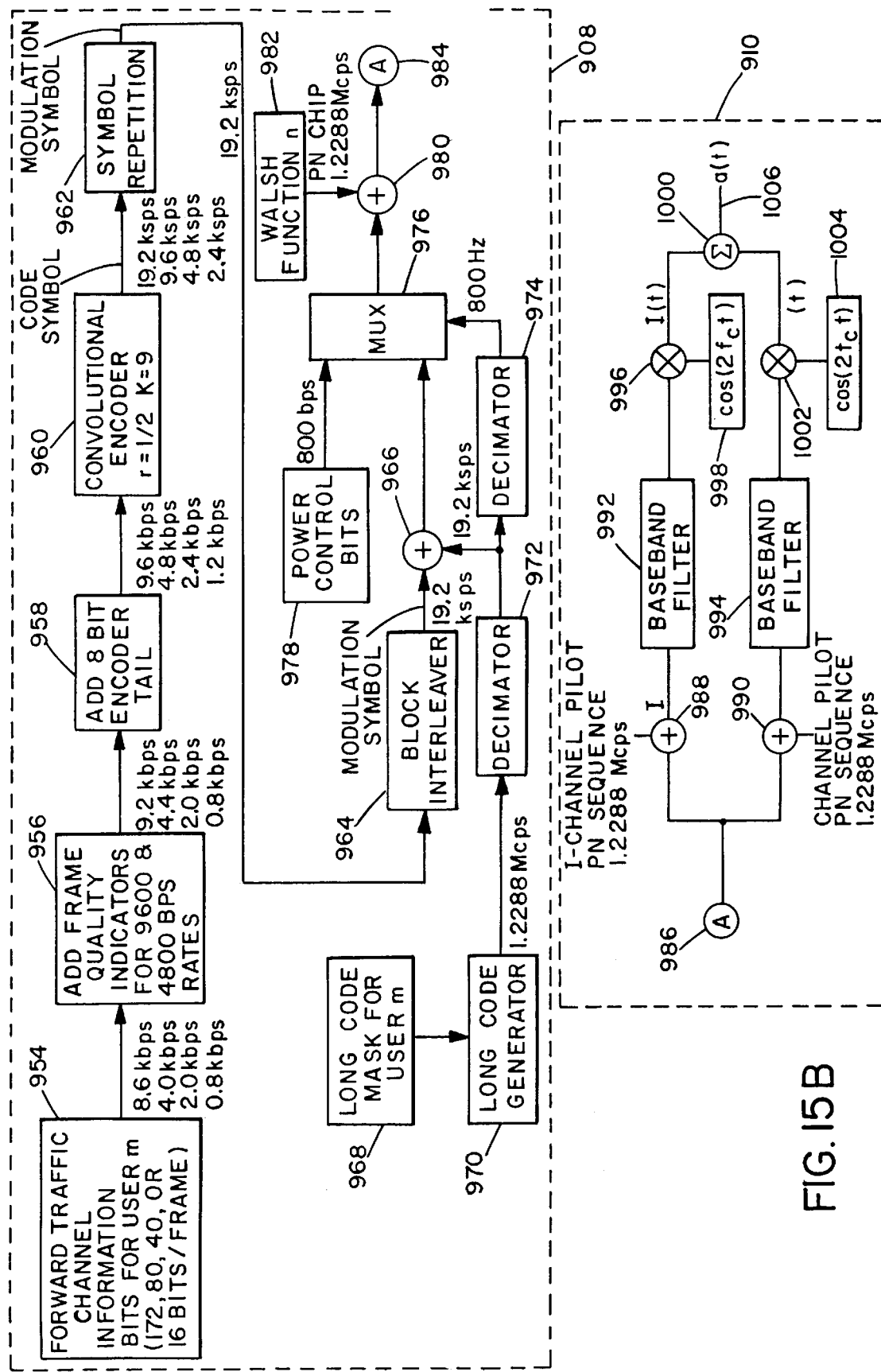

Referring now to FIG. 15, a block diagram of an indoor base station transmitter showing some of the modifications to a conventional transmitter which are necessary to implement a chip level synchronization with another communication system is shown and generally designated 900. Block 902 shows the pilot channel generator 912 summed in summer 914 with a Walsh function generator 916 of Walsh code "O" and the result is provided to output 918. Block 904 is the sync channel generator which passes sync channel bits 920 through a convolutional encoder 922 and symbol repetition 924 and block interleaver 926 to create a modulation symbol which is added to the output from a Walsh function 32 code generator 930 through adder 928 and out to output 932. As is known, in a typical CDMA transmitter, the Walsh function code should be 64.

Block 906 generates the paging channel by receiving paging channel bits 934 and providing them to a convolutional encoded 936 and symbol repetition 938 to block interleaver 940. The modulation symbol output from the block interleaver 940 is added in adder 942 to a long code which is processed through a long code generator 944 and decimator 946. The output from the adder 942 is then added to a Walsh function "P" from Walsh code generator 950 and provided to output 952.

Block 908 receives the forward traffic channel information 954 and provides frame quality indicators 956 and adds an 8 bit encoder tail 958 which is then convolutionally encoded in encoder 960. The output from the encoder 960 passes through the symbol repetition block 962 to create a modulation symbol which is then interleaved in interleaver 964. The output from the interleaver 964 is added in adder 966 to the long code mask 968 of the user which has been generated in block 970 and decimated in decimator 972. The output from the adder 966 is provided to multiplexer 976 which also receives power control bits 978 and a second-decimated long code from decimator 974. The output of the multiplexer is added to a Walsh code "N" from generator 982, and the output of the adder 980 is provided to output 984.

Block 910 is the QPSK modulation block diagram which receives at input 986 a signal from any one of blocks 902, 904, 906, or 908 above. The input signal is split into the I-channel and the Q-channel through summers 988 and 990, respectively. the I-channel output passes through a baseband filter 992 and is then modulated in mixer 996 with a cos (ωt) signal generator 998 and provided to summer 1000. Similarly, the Q-channel output passes through a baseband filter 994 and is then modulated in mixer 1002 with the sin (ωt) signal generator 1004, and provided to summer 1000. The output 1006 of the summer 1000 contains both a quadrature representation of the codes which were generated in blocks 902, 904, 906 and 908 of FIG. 15.

The modifications that could be made to the above described transmitter, for example, in order to reduce the processing gain by three, include puncturing the output of the symbol repetition to reduce the data rate down to 14.4 kbps, and to use Walsh codes of length 32, as shown in Block 904 and discussed above.

Figure 22:
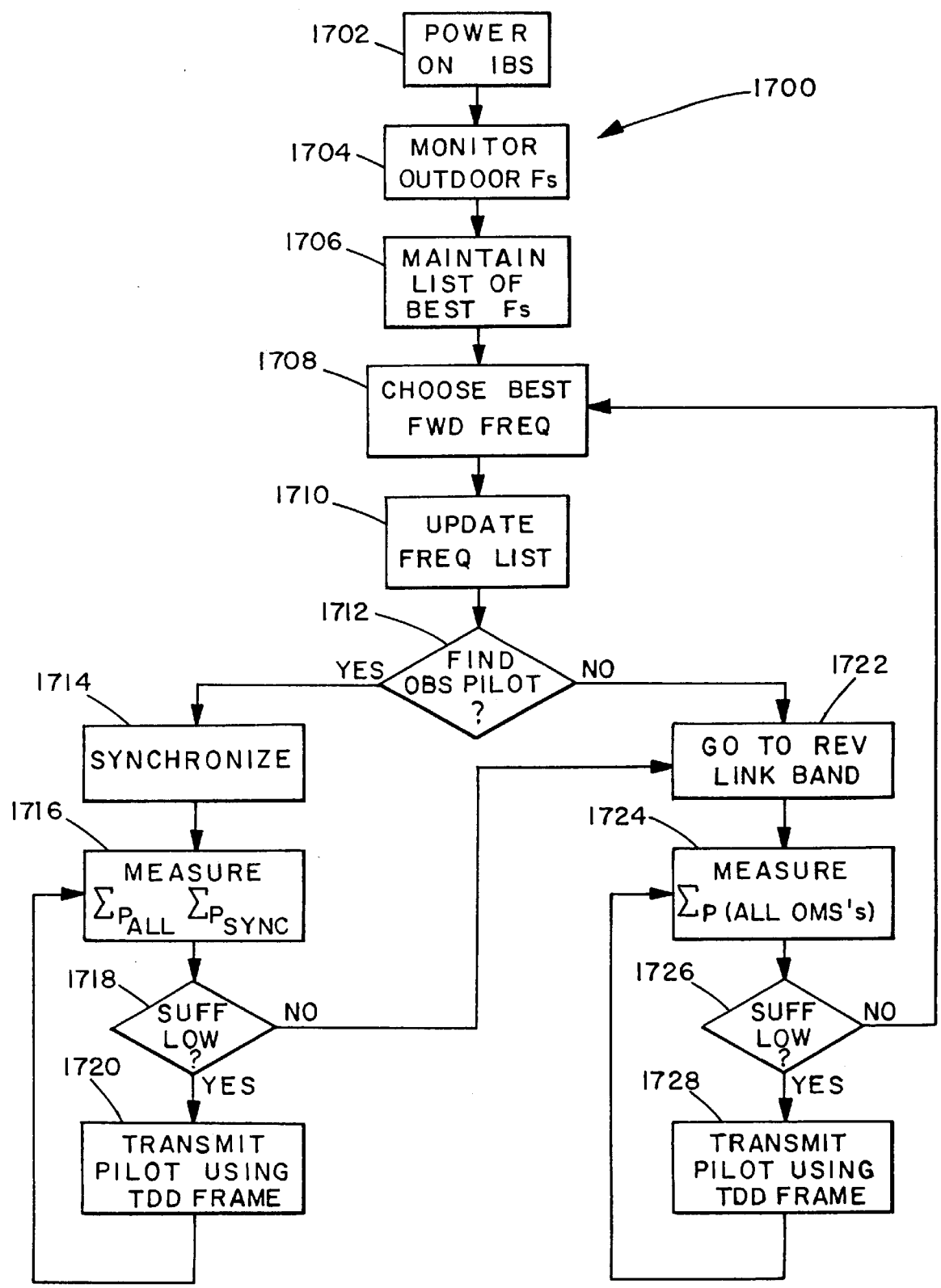
FIG. 22 is a flow chart showing the sequence used to power-on and synchronize an IBS to an OBS or OMS signal.

In the operation of the system of the present invention, both the IMS and the IBS initiate a monitoring and synchronization sequence upon being introduced into the system. Referring now to FIG. 22, a flow chart showing the sequence used to power-on and synchronize an IBS to an OBS or OMS signal is generally designated 1700. Flow chart 1700 begins with the power-on of the IBS in first step 1702. Once activated, the IBS begins to monitor the frequency bands of the outdoor systems in step 1704. By monitoring the outdoor frequency bands for a period of time, the channels or frequencies which have the least interference power will become apparent. In step 1706, the IBS maintains a list of the channels or frequencies having the lowest relative interference powers within the frequency band being monitored. Alternatively, the list of candidate frequencies can be created by selecting the frequencies according to the strength of the pilot signal, with the strongest pilot signal being at the top of the list. Using either method, the list is typically cyclic, having a number of frequency entries which are constantly updated to reflect the currently suitable frequencies. Once a list of suitable candidate frequencies has been compiled, the forward link of the best frequency is automatically selected in step 1708, and the frequency list is again updated in step 1710. Typically, the best frequency selected in step 1708 is the frequency where there is the least interference in the forward link of the outdoor system, however, it is also possible that the best frequency may not be the one with the best forward link since the selection of the best frequency is based upon evaluation of the combined forward and reverse links of the candidate frequency or channel. Thus, only after identification of the best frequency is the forward link selected and used.

Once the most suitable channel or frequency has been selected, the IBS attempts to locate the OBS pilot signal associated with that frequency, as shown in step 1712. If the OBS pilot signal is successfully found, then the IBS synchronizes itself to the OBS (step 1714.) Once synchronized, the IBS continually monitors the frequency environment to ensure that the frequency selected is the best frequency available. This operation is performed in step 1716, which includes the measurement of the sum power of all OBSs and subtracting the power from the OBS to which the IBS is synchronized. If this measurement and calculation is sufficiently low, as detected in step 1718, the IBS begins to transmit its pilot signal in step 1720, using the forward link and using the TDD frames of FIGS. 2, 9 and/or 10.

In the event that the measurements and calculation indicate that the power level of the synchronized frequency is not sufficiently low as determined in step 1718, or if the IBS was unable to find the OBS pilot signal during step 1712, in step 1722, the IBS switches to the reverse link of the same frequency band or channel that was identified in step 1706. The IBS then monitors and measures the power levels of all OMSs within the frequency band in 1724. If the sum power of the frequency bands is sufficiently low, as determined in step 1726, the IBS begins transmitting its pilot signal using the best frequency and using the TDD frames of FIGS. 2, 9, and/or 10.

If the interference levels in the reverse link of the selected frequency band exceed the acceptable threshold, i.e., do not have a sufficiently low power level as determined in step 1726, the IBS returns to step 1708 to retry the forward frequency from the best of list of those suitable frequencies available.

Figure 23:
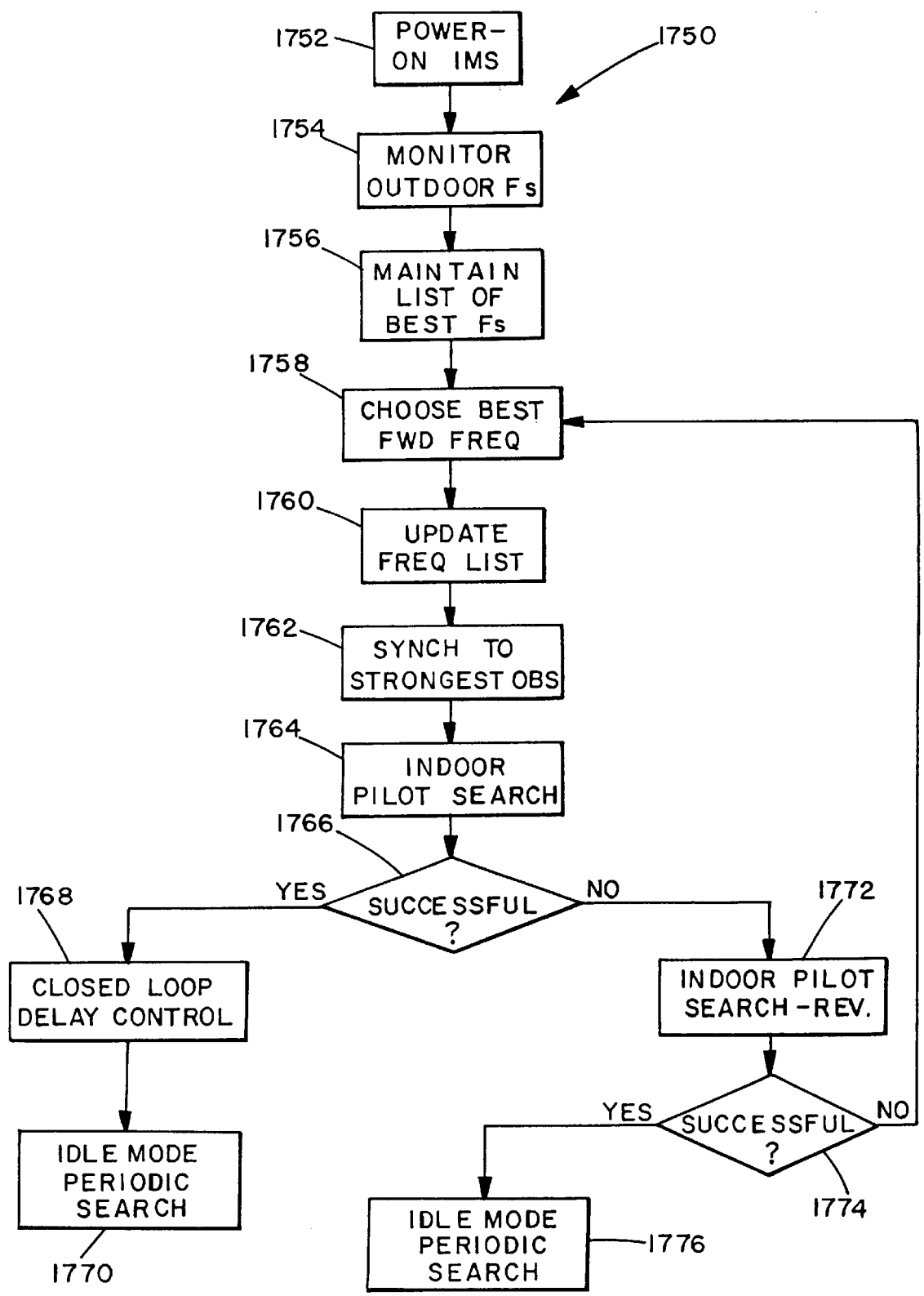
FIG. 23 is a flow chart showing the sequence used to power-on and synchronize an IMS to an OBS or OMS signal.

FIG. 23 is a flow chart showing the sequence used to power-on and synchronize an IMS to an OBS or OMS signal and is generally designated 1750. Flow chart 1750 begins with the power-on of the IMS in step 1752, which allows the IMS to monitor the frequency bands of the outdoor system in step 1754. Once the outdoor frequencies have been monitored for a sufficient period, a list of the best candidate frequencies or channels is compiled in step 1756. The forward link of the best frequency or channel is then selected in step 1758. Once the best frequency is selected, the frequency list is updated in step 1760. The frequency list is generally cyclic, as described above. Once the forward link of the best frequency is selected, the IMS synchronizes to the strongest OBS signal within the frequency band in step 1762. Because the IBS has also synchronized to the best frequency of the outdoor system, the IBS begins to search for the IBS pilot code in step 1764. If the search for the IBS pilot code is successful, as determined in step 1766, the IMS implements the closed loop delay control which further synchronizes the IMS to the IBS. Following a successful synchronization, the IMS enters an idle mode as shown in step 1770.

If the search for the indoor pilot code in the forward link of the selected frequency was unsuccessful in step 1766, the IMS switches to the reverse link of the selected frequency and begins to search for an indoor pilot code. If the IMS was successful in finding the indoor pilot code in the reverse link band as determined in step 1774, then the IMS enters an idle mode which includes a periodic search for the indoor pilot code. If the IMS is still unable to identify the indoor pilot code as determined in step 1744, the IMS returns to step 1758 to choose the best forward frequency from the list, again automatically starting with the forward link of the newly selected frequency.

It should be appreciated that although this application discusses the application of the present invention to a system which is based on CDMA technology, and specifically an IS-95-based standard, any other CDMA standard or system, including ANSI J-STD-008, can implement the present invention. Moreover, although the present invention has been described in detail surrounding a cellular communication network, it should be recognized that the present invention may be utilized with the same effectiveness within an environment where only one other communication system is operating, and that the other communication system may be either a similarly powered system a higher powered system, or a lower powered system.

What is claimed is:

1. An indoor CDMA communication system operable within the coverage area of an outdoor communication system, the outdoor communication system using an uplink frequency band for uplinking signals and a downlink frequency band for downlinking signals, the indoor CDMA communication system comprising:

at least one mobile station transceiver;

an indoor base station transceiver operating transparently within the coverage area of the outdoor communication system, the indoor base station transceiver comprising:

monitoring means for periodically monitoring the uplink frequency band and the downlink frequency band;

means for determining a plurality of candidate frequencies on one of either the uplink frequency band or the downlink frequency band based upon a pre-determined acceptable interference level;

means for selecting one candidate frequency from said plurality of candidate frequencies for use in bi-directional communication between said indoor base station transceiver and said at least one mobile station transceiver.

2. The indoor CDMA communication system of claim 1, wherein said bi-directional communication is a time division duplex (TDD) format.

3. The indoor CDMA communication system of claim 2, wherein said TDD format comprises:

a transmit time slot wherein either said indoor base station transceiver or said at least one mobile station transceiver transmits information over said one candidate frequency;

a receive time slot wherein either said indoor base station transceiver or said at least one mobile station transceiver receive information over said one candidate frequency; and a monitor time slot utilized by the monitoring means wherein neither said indoor base station transceiver nor said at least one mobile station transceiver transmit or receive information, and instead monitor the usage or interference dynamically changing interference levels on said plurality of candidate frequencies.

4. The indoor CDMA communication system of claim 1, wherein the outdoor communication system is a CDMA-based system.

5. The indoor CDMA communication system of claim 4, wherein the indoor CDMA communications system and the outdoor communication system operate according to an IS-95-based standard.

6. The indoor CDMA communication system of claim 4, wherein the indoor CDMA communications system and the outdoor communication system operate according to an ANSI J-STD-008 standard.

7. The indoor CDMA communication system of claim 1 further comprising means responsive to selection of said one candidate frequency for selecting a forward link component of said one candidate frequency, said forward link component falling within said downlink frequency band.

8. The indoor CDMA communication system of claim 1, wherein said plurality of candidate frequencies comprises low-use frequencies.

9. The indoor CDMA communication system of claim 1, wherein said plurality of candidate frequencies comprises non-interfering frequencies.

10. A communication system transparently operable within the coverage area of a second communication system, the second communication system using a first frequency band for uplinking signals and a second frequency band for downlinking signals, the communication system comprising:
  a base station transceiver within the coverage area of the second communication system, wherein the second communication system remains unaffected by the operation of the communication system;
  a mobile station transceiver for communicating with the base station transceiver;
  a monitoring means associated with the base station for monitoring the first frequency band and the second frequency band to determine a plurality of candidate spreading codes orthogonal to those used in the second communication system of one of either the first frequency band or the second frequency band; and
  a means for selecting one spreading code of said plurality of candidate spreading codes for use in the communication between said base station transceiver and said mobile station transceiver.

11. A method of minimizing interference in a first communication system operable within the coverage area of a second communication system using a spreading code to identify a channel within a first frequency band for uplinking signals and a second frequency band for downlinking signals, said first communication system comprising a base station transceiver and a mobile station transceiver, the method comprising:
  (a) monitoring the first frequency band and the second frequency band by said base station transceiver to determine a plurality of candidate frequencies;
  (b) selecting one candidate frequency of said plurality of candidate frequencies for use in communication between said base station transceiver and said mobile station transceiver;
  (c) communicating information about said one candidate frequency from said base station transceiver to said mobile station transceiver;
  (d) communicating in a TDD format between said base station 16 transceiver and said mobile station transceiver using said one candidate frequency; and
  (e) repeating steps (a) through (d) during a periodic time frame to allow the second communication system to re-select the one candidate frequency in response to use of the selected one candidate frequency by the first communication system.

12. The method of claim 11, further comprising the step of selecting a forward link band of said one candidate frequency after the step of selecting one candidate frequency.

13. The method of claim 12, wherein the steps of communicating use the forward link band of said one candidate frequency, the forward link band falling within the second frequency band.

14. The method of claim 12, further comprising the steps of:
  measuring a first interference level within the forward link band;
  comparing the first interference level to a pre-determined threshold; and
  switching to a reverse link band of said one candidate frequency if the first interference level exceeds the pre-determined threshold so that the steps of communicating uses the reverse link band of said one candidate frequency, the reverse link band falling within the first frequency band.

15. The method of claim 11, wherein said plurality of candidate frequencies comprises low-use frequencies.

16. The method of claim 11, wherein said plurality of candidate frequencies comprises non-interfering frequencies.

17. The method of claim 11, further comprising:
  monitoring the first frequency band and the second frequency band by said mobile station transceiver to determine additional candidate frequencies;
  recording said additional candidate frequencies; and
  communicating said additional candidate frequencies from said mobile station transceiver to said base station transceiver.

18. A method establishing a communication between a base station and a mobile station transceiver of a first communication system operating within a coverage area of a second communication system, the second communication system using a first frequency band for uplinking signals and a second frequency band for downlinking signals, the method comprising:
  monitoring the first frequency band and the second frequency band by said base station transceiver to determine a strongest interfering signal from the second communication system;
  identifying a first phase which the strongest interfering signal from the second communication system reaches said mobile station transceiver;
  identifying a second phase which a signal transmitted from said base station transceiver reaches said mobile station transceiver;
  calculating a phase error which indicates a difference between the first phase and the second phase; and
  adjusting a transmission timing of said base station transceiver to minimize any difference between said phase error and a predetermined optimal phase difference; and
  establishing communication between said base station transceiver and said mobile station transceiver by synchronizing the communication with the strongest interfering signal from the second communication system, wherein the base station transceiver utilizes the adjusted transmission timing.

19. The method of claim 18 wherein said optimal phase difference is 90 degrees so that said signal from said base station transceiver is orthogonal to a signal received from the second communication system.

* * * * *

UNITED STATES PATENT AND TRADEMARK OFFICE
CERTIFICATE OF CORRECTION

PATENT NO.    : 6,101,176
DATED         : August 8, 2000
INVENTOR(S)   : Harri Honkasalo et al.

It is certified that error appears in the above-identified patent and that said Letters Patent is hereby corrected as shown below:

Column 33,
Line 57, before "transceiver" and after "station", delete "16".

Signed and Sealed this

Fourth Day of June, 2002

Attest:

Attesting Officer

JAMES E. ROGAN
Director of the United States Patent and Trademark Office